(12) United States Patent
Kim et al.

(10) Patent No.: US 7,356,614 B2
(45) Date of Patent: Apr. 8, 2008

(54) METHOD FOR DETECTING AND REGULATING IDENTIFIER OVERLAP ON POWER LINE COMMUNICATION NETWORK, ELECTRONIC APPLIANCE CONNECTED TO SUBNET OF POWER LINE COMMUNICATION NETWORK, AND COMMUNICATION MODULE USED IN ELECTRONIC APPLIANCE

(75) Inventors: Chul Kim, Namyangju-shi (KR); Chung Ha Park, Inchon-kwangyok-shi (KR)

(73) Assignee: LG Electronics, Inc., Seoul (KR)

( * ) Notice: Subject to any disclaimer, the term of this patent is extended or adjusted under 35 U.S.C. 154(b) by 934 days.

(21) Appl. No.: 10/244,525

(22) Filed: Sep. 17, 2002

(65) Prior Publication Data

US 2003/0055923 A1    Mar. 20, 2003

(30) Foreign Application Priority Data

Sep. 17, 2001    (KR)    ............................ 2001-0057317

(51) Int. Cl.
  G06F 15/16    (2006.01)
  G06F 15/173    (2006.01)
  G06F 15/177    (2006.01)
  H04L 12/56    (2006.01)

(52) U.S. Cl. ................. 709/245; 709/220; 709/221; 709/222; 709/223; 709/224; 709/225; 709/226; 340/2.23; 370/389; 370/427

(58) Field of Classification Search ................. None
  See application file for complete search history.

(56) References Cited

U.S. PATENT DOCUMENTS 5,724,510 A * 3/1998 Arndt et al. ................ 709/220

6,272,551 B1    8/2001 Martin et al.
6,493,340 B1 * 12/2002 Kawanaka ................ 370/392
6,959,009 B2 * 10/2005 Asokan et al. ............. 709/219

(Continued)

FOREIGN PATENT DOCUMENTS

JP    2001308909 A * 11/2001

OTHER PUBLICATIONS

International Search Report; Austrian Patent Office; Aug. 12, 2003.

*Primary Examiner*—John Follansbee
*Assistant Examiner*—Hassan Phillips
(74) *Attorney, Agent, or Firm*—McKenna Long & Aldridge LLP

(57) ABSTRACT

A method for detecting and regulating subnet identifier overlap on a power line communication network includes a communication module. The communication module includes an identifier generating means for generating at least two identifiers for identifying a home subnet; an identifier setup means for generating an identifier different from identifiers of outside subnets; an identifier storing means for storing the generated identifiers; a transceiver for broadcasting a data packet including at least one identifier among at least two identifiers over a communication network; a comparing means for comparing the identifiers included in the received data packet with corresponding identifiers identifying its home subnet; and an overlap detecting means for determining whether more than one subnet uses the corresponding identifier when a part of at least two identifiers included in the received data packet is the same as the identifier identifying its home subnet and the remaining part is different.

39 Claims, 16 Drawing Sheets

U.S. PATENT DOCUMENTS

| | | |
|---|---|---|
| 7,035,941 B2 * | 4/2006 | Shirai et al. ................. 709/245 |
| 2001/0017857 A1 * | 8/2001 | Matsukawa ................. 370/392 |
| 2002/0000792 A1 * | 1/2002 | Hanaki ....................... 323/234 |
| 2002/0011923 A1 * | 1/2002 | Cunningham et al. . 340/310.01 |
| 2002/0169914 A1 | 11/2002 | Shteyn |
| 2003/0001721 A1 * | 1/2003 | Daum et al. .................. 340/5.8 |
| 2003/0109938 A1 * | 6/2003 | Daum et al. ................... 700/11 |

* cited by examiner

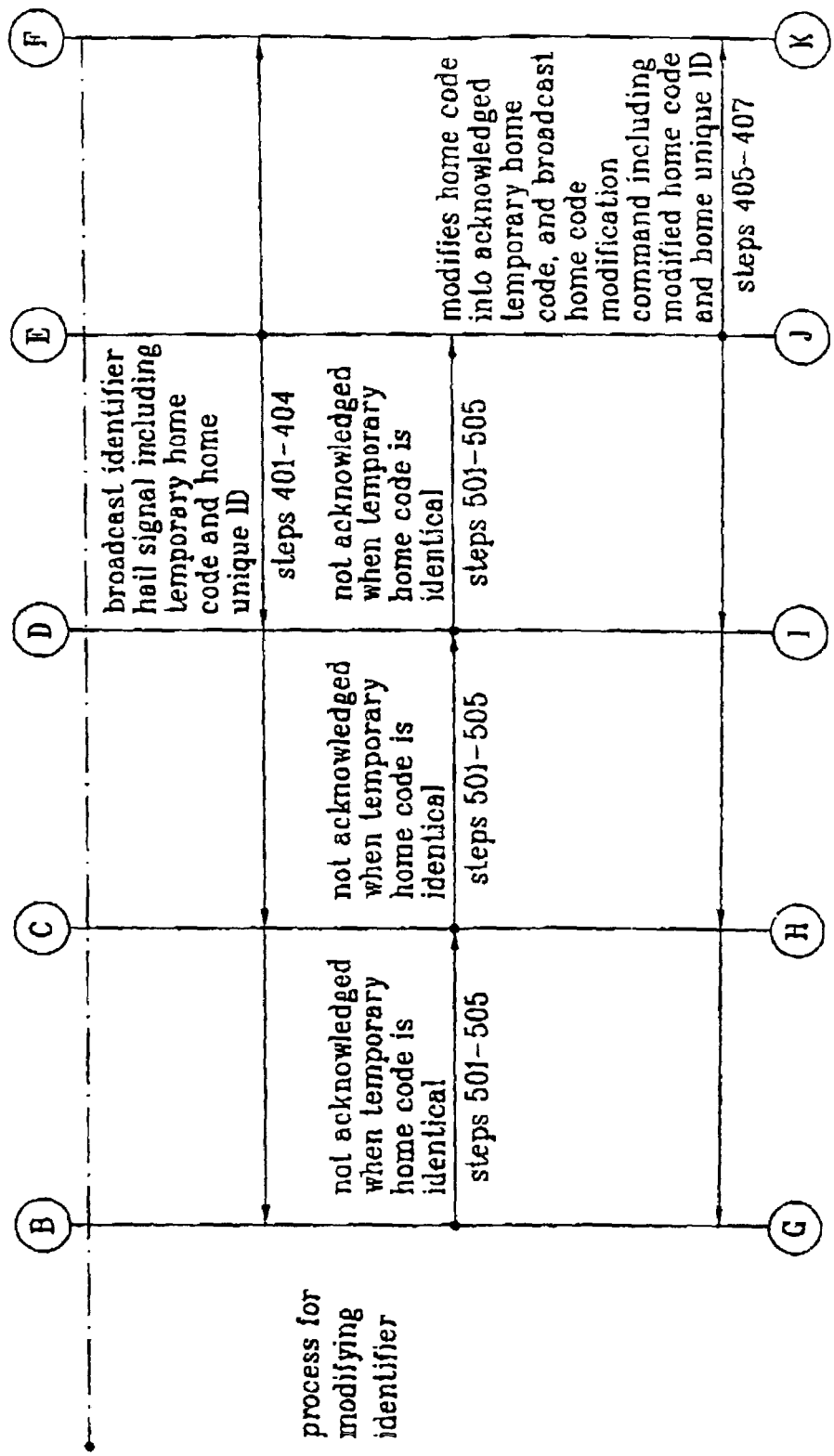

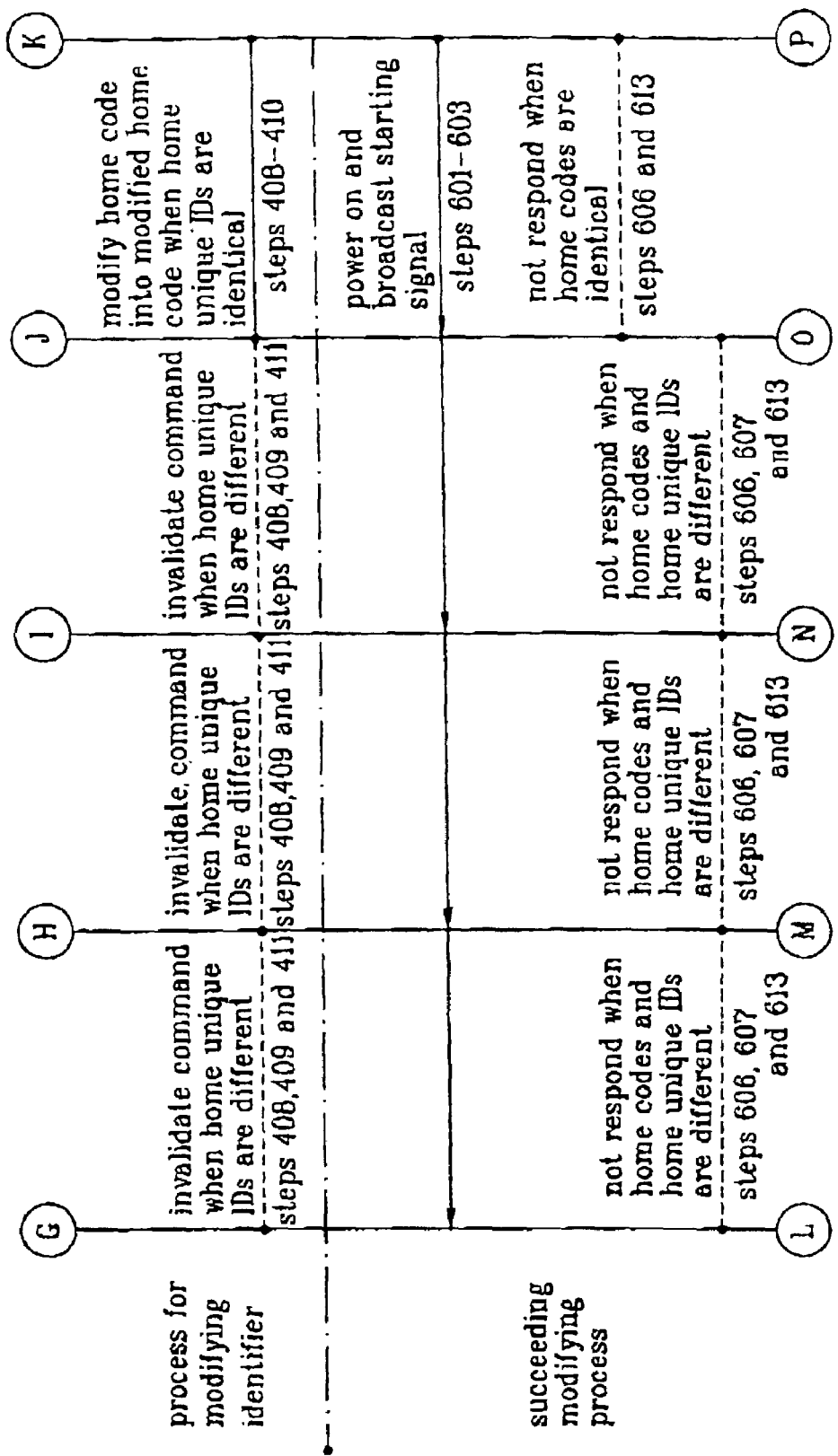

METHOD FOR DETECTING AND REGULATING IDENTIFIER OVERLAP ON POWER LINE COMMUNICATION NETWORK, ELECTRONIC APPLIANCE CONNECTED TO SUBNET OF POWER LINE COMMUNICATION NETWORK, AND COMMUNICATION MODULE USED IN ELECTRONIC APPLIANCE

This application claims the benefit of Korean Patent Application No. 2001-57317, filed on Sep. 17, 2001, which is hereby incorporated by reference for all purposes as if fully set forth herein.

BACKGROUND OF THE INVENTION

1. Field of the Invention

The present invention relates to a method of detecting and regulating subnet identifier overlap on a communication network using an open communication medium. More particularly, the present invention relates to a method for detecting and regulating identifier overlap by using a dual identifier as an identifier for identifying a subnet.

2. Discussion of the Related Art

Open communication mediums are communication mediums that are not only distributed within a predetermined control range, but also extend outside the predetermined control range. Accordingly, open communication mediums (e.g., a power lines) enable nodes within a predetermined control range to communicate with other nodes outside the predetermined control range.

Subnets (e.g., home networks) are portions of communication networks and comprise nodes (e.g., electronic appliances) that may communicate with each other via the aforementioned open communication medium. Generally, electronic appliances have a specific control range and may communicate with other electronic appliances within their specific control range via power lines found within a home network.

Communication between electronic appliances within a home network via power lines (i.e., power line networking) has been widely supported primarily because power line networking does not require extra communications mediums.

Power line networking requires electronic appliances within the specific control range to transmit and receive data packets through power lines using a transceiver (e.g., a carrier-current transceiver). Further, power line networking requires the electronic appliances to be connected to an external communication network, such as the Internet, through a gateway.

Power lines within a home network do not constitute a closed distribution network within the specific control range but, rather, constitute an open distribution network (i.e., a network that branches from a power transmission site to each house network). Typically, data packets are transmitted between electronic appliances within open networks by employing broadcasting methods (i.e., transmission methods not using routers). Accordingly, data packets broadcasted by one electronic appliance within the specific control range are transmitted not only to other electronic appliances within the specific control range of the home network, but are also transmitted to electronic appliances existing outside the specific control range. Accordingly, open networks enable data packets transmitted from an electronic appliance in one house to be broadcasted to electronic appliances in other houses that are connected to the same power transmission site. One undesirable consequence of broadcasting within an open network occurs, however, when an electronic appliance located outside of a transmitting home network receives a command or other information within the broadcasted data packet in that the receiving appliance typically fails to function properly.

One method, proposed in order to solve the aforementioned problem, involves the installation of a blocking filter on a power line between the power transmission site and the home network. In theory, a blocking filter so installed could prevent data packets from being broadcasted to electronic appliances outside the transmitting home network. However, installing such a blocking filter is a relatively expensive solution to the aforementioned problem and it is often difficult to determine where an appropriate installation location exists. Moreover, information within data packets may still be leaked through other lines such as telephone lines, and the blocking filter may be improperly operated.

Data packets transmitted by electronic appliances found within home networks may include identifiers called home codes. Electronic appliances may selectively receive the transmitted data packets based on the identifier. For example, electronic appliances within the same home network must have the same identifier. Selection of a suitable identifier is essential to enable electronic appliances within a home network to communicate with each, according to their specific control range.

Methods for selecting a suitable identifier typically use hardware operating means, e.g., a dip switch. Using the hardware operating means, the identifier is selected by operating the dip switch prior to connecting the electronic appliance to a power line. As operating a dip switch may be difficult, an on-site service is usually provided by representatives of the electronic appliance companies wherein the representative confirms and adjusts the identifier for use within a particular home network. A problem still exists, however, that there is no proper method for detecting when an identifier selected in a first home network is identical to an identifier selected in a second home network, connected to the first home network by a power transmission site.

In order to solve the foregoing problem, the inventors of the present invention have disclosed "Power Line Communication Device Having Plug and Play Function" (non laid-open Korea patent application 10-2001-0011846, applied for registration on Mar. 7, 2001). The communication device disclosed in the non laid-open patent application includes a home code management module for managing a home code identifier that is uniformly provided to nodes existing within a specific control range among a plurality of nodes that are connected to a power line; an area code setup module for creating an area code identifier that is uniformly provided to nodes in the same area after the nodes existing within the control range are classified according to areas in which they exist; a group code setup module for creating a group code identifier that is uniformly provided to nodes of the same group by grouping the nodes existing within the control range according to predetermined correlations; and a device code management module for managing a device code identifier that is uniformly provided to each node. When power is connected to the respective nodes, the aforementioned modules automatically create a home code and an address to the nodes by broadcasting an identifier hail signal and receiving a response. While the aforementioned communication device solves problems related to dip switch operation, an algorithm used to detect and regulate home code overlap before generation of the home code is complicated.

SUMMARY OF THE INVENTION

Accordingly, the present invention is directed to a method for detecting and regulating identifier overlap in a open communication network using an open communication medium, a node (e.g., an electronic appliance) connected to a subnet of the communication network, and a communication module used in the node that substantially obviate one or more problems due to limitations and disadvantages of the related art.

The present invention provides a subnet connected to a communication network via an open communication medium, a node connected to the subnet, and a communication module used as a node of the subnet.

The present invention also provides a communication network that detect and regulate home code overlap generated after a subnet is created. In one aspect of the present invention, the subnets are connected to the communication network via an open communication medium, each of the subnets include at least one node. In another aspect of the present invention, each of the nodes includes an identifier storing means for storing at least two kinds of identifiers as identifiers for identifying their subnet, an identifier generating means for adding at least one of the two types of identifiers within a data packet, and a transceiver for broadcasting a data packet. In another aspect of the present invention, the transceiver includes a subnet identifying means for identifying the subnet to which the node broadcasting the data packet belongs according to at least one of the two types of identifiers received within the broadcasted data packet.

An advantage of the present invention provides a method for detecting identifier overlap between at least two subnets connected, via an open communication medium (e.g., power line), to a communication network existing within the open communication range and modifying the overlapping identifiers. In one aspect of the present invention, a subnet may be identified using two identifier types that substantially obviates one or more problems due to limitations and disadvantages of the related art.

In another aspect of the present invention, an open communication range is a range of nodes that a data packet broadcasted transmits to through the open communication medium.

In yet another aspect of the present invention, an electronic appliance may be provided as a node of the subnet.

Additional advantages and features of the invention will be set forth in part in the description which follows and in part will become apparent to those having ordinary skill in the art upon examination of the following or may be learned from practice of the invention. These and other advantages of the invention may be realized and attained by the structure particularly pointed out in the written description and claims hereof as well as the appended drawings.

To achieve these and other advantages and in accordance with the purpose of the invention, as embodied and broadly described herein a node includes an identifier generating means for generating at least two types of identifiers for identifying its subnet; an identifier setup means for generating an identifier for identifying its subnet, wherein the identifier generated by the identifier setup means is different from identifiers of generated by outside subnets; an identifier storing means for storing the generated identifiers; a transceiver for broadcasting a data packet including at least one type of identifier among at least two types of identifiers over a communication network; a comparing means for comparing the identifiers included in a received data packet with corresponding identifiers included in the broadcasted data packet; and an overlap detecting means for determining whether another subnet is using the corresponding identifiers when at least one of the at least two types of identifiers included in the received data packet is same as the identifiers in the broadcasted data packet and when the other of the at least two types of identifiers included in the received data packet is different from the identifiers in the broadcasted data packet.

The node may comprise communication components included within a communication module and functional components included within of the node allowing the node to perform another function (e.g., an original function of the appliance).

In one aspect of the present invention, a method is provided for detecting overlap of a first identifier type between home and outside subnets, wherein a home subnet may be identified using a second identifier type. Nodes within a subnet may communicate with each other by enabling a transmission node in that subnet to broadcast a data packet including the first identifier type, for identifying its home subnet, through an open communication medium, and enabling a reception node in that subnet to receive and either validate the broadcasted data packet when the first identifier type included within the received broadcasted data packet is identical to a first identifier type by which its home subnet is identified by, or invalidate the data packet when the first identifier type is different.

In one aspect of the present invention, the method for detecting overlap includes, via a transmission node, generating and broadcasting a data packet including first and second identifier types on a communication network; via a reception node, comparing first and second identifier types included within the received data packet with first and second identifier types by which its home subnet is identified by; and, via the reception node, after comparing, determining that an outside subnet uses a first identifier type that is identical to the first identifier type used by its own home subnet when the first identifier type within the received data packet is identical to its home first identifier type and when the second identifier type within the received data packet is different from its home second identifier type.

In one aspect of the present invention, the method for detecting overlap further includes, via the reception node and after the determining, broadcasting a signal announcing detection of an overlap of identifier types over the communication network. When the reception node receives a signal announcing a detection of overlap of identifier types on the communication network from an outside node, the receiving reception node does not broadcast it.

In another aspect of the present invention, a method is provided for detecting overlap of a first identifier type between home and outside subnets and modifying a first identifier type using a second identifier type, wherein a home subnet may be identified using the second identifier type. Nodes within a subnet may communicate with each other by enabling a transmission node in that subnet to generate and broadcast a data packet including the first identifier type, for identifying its home subnet, through an open communication medium, and enabling a reception node in that subnet to receive and either validate the received data packet when the first identifier type included within the received broadcasted data packet is identical to a first identifier type by which its home subnet is identified by, or invalidate the data packet when the first identifier type is different.

In one aspect of the present invention, the method for modifying the identifier includes generating a new first identifier type for identifying its home subnet and temporarily storing it as a temporary first identifier type; generating an identifier hail signal including the temporary first identifier type and an existing second identifier type; broadcasting the identifier hail signal over the communication network; determining whether a non-acknowledgment signal transmitted in response to the broadcasted identifier hail signal is received within a predetermined amount of time; repeating the generating and storing the identifier type when a non-acknowledgment signal is received; and generating and storing the temporary first identifier type as a formal first identifier type when no non-acknowledgment signal is received within the predetermined amount of time.

In one aspect of the present invention, the determining step includes a step for counting a number of clock signals generated and maintaining a standby state to receive a data packet; a first determining step for determining whether the received data packet includes a non-acknowledgment signal; a second determining step for determining whether the received data packet includes a non-acknowledgment signal transmitted in response to its broadcasted identifier hail signal if it determined in the first determining step that the received data packet includes a non-acknowledgment signal; and a third determining step for determining whether a number of clock signals counted in the standby state exceeds predetermined number of clock signals if it is determined in the second determining step that the non-acknowledgment signal included within the received data packet was not transmitted in response to its broadcasted identifier hail signal. When the result of either the first or third determining steps is negative, the standby state is maintained. When the result of the second determining step is positive, the steps for generating and storing the identifier type are repeated. When the result of the third determining step is positive, the identifier type that was broadcasted is stored as a formal identifier type.

Additionally, the method of modifying the identifier may further include, after storing the formal first identifier type, modifying the first identifier types of all nodes within the home subnet as the such that the identifier types of all of the nodes within the home subnet are identical to the stored formal first identifier type.

In one aspect of the present invention, modifying the first identifier types of the other nodes within the home subnet may include generating an identifier modification command at the node where the formal identifier type is first stored, wherein the identifier modification command includes the formal first identifier type and the second identifier type, broadcasting the identifier modification command over the communication network, comparing, via a reception node on the communication network, the second identifier type included in the broadcasted identifier modification command with a second identifier type specific to its home subnet, and, via the reception node, modifying its first identifier type such that its first identifier type is identical to the first identifier type included within the broadcasted identifier modification command if it is determined that the broadcasted second identifier type is identical to its second identifier type.

In another aspect of the present invention, a method is provided for modifying a first identifier of a node in a subnet using a second identifier after first identifiers of other nodes in the subnet have already been modified. In the present aspect, nodes belonging to the same subnet communicate with each other by enabling a transmission node to generate a data packet including the first identifier for identifying its subnet and broadcast it through an open communication medium, and enable a reception node to either validate the received data packet when the first identifier included in the received data packet is identical to the first kind identifier that identifies its subnet or invalidate the data packet when they are different.

In one aspect of the present invention, nodes which do not modify their identifiers when their subnet detects overlap may modify the identifiers at a subsequent point in time.

In one aspect of the present invention, a method for modifying an identifier when a node is powered-on includes starting a node and generating a starting signal, wherein the starting signal includes the first identifier type and the second identifier type, broadcasting the starting signal over the communication network; a first identifier comparing step wherein a reception node compares the first identifier type and the second identifier type included in the broadcasted starting signal with its first identifier type and second identifier type; a step wherein the reception node generates and broadcasts an identifier modification command including its first identifier type and second identifier type when the first identifiers types are different and the second identifiers types are identical in the first identifier comparing step; a second identifier comparing step wherein the starting node compares the first identifier type and the second identifier type included in the broadcasted identifier modification command with its first identifier type and second identifier type; and a step wherein the reception node modifies its first identifier type into the first identifier type included within the broadcasted identifier modification command when the first identifier types are different and the second identifier types are identical in the second identifier comparing step.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings:

FIGS. 13A through 13D illustrates a sequence map of a data processing flow between the nodes when the processes of FIG. 7 to FIGS. 12A and 12B are performed.

DETAILED DESCRIPTION OF THE ILLUSTRATED EMBODIMENTS

Reference will now be made in detail to embodiments of the present invention, examples of which are illustrated in the accompanying drawings.

According to the principles of the present invention, a plurality of electronic appliances (i.e., nodes) connected to a power line (i.e., communication medium) each located within one of plurality of home networks (i.e., subnets) create a communication network. Each subnet may be identified by a dual type identifier. The dual identifier may include a first identifier type called a home code and a second identifier type called a unique home ID.

Figure 1:
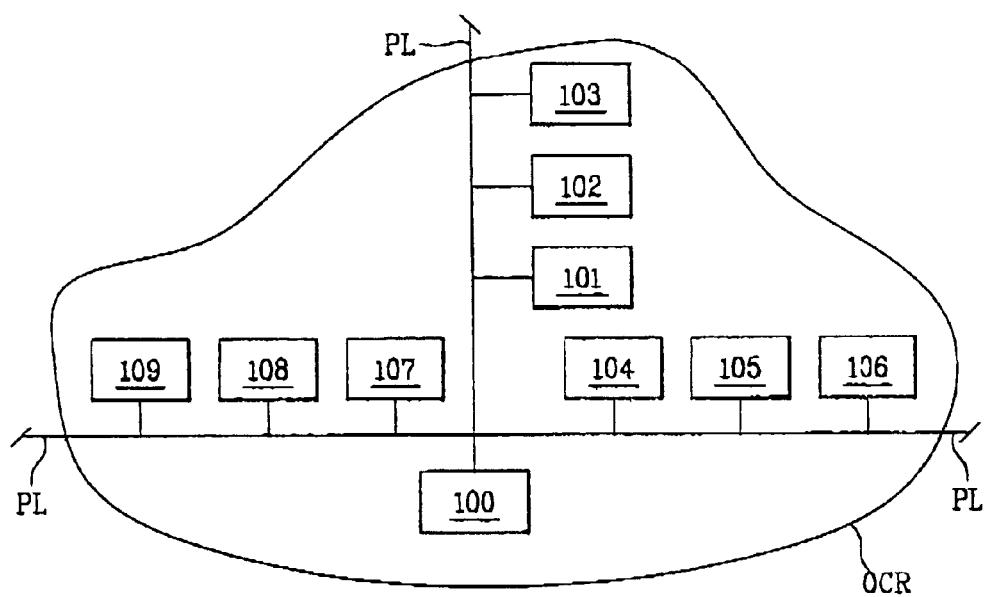
FIG. 1 illustrates a schematic block diagram of a communication network according to the principles of the present invention.
Figure 3:
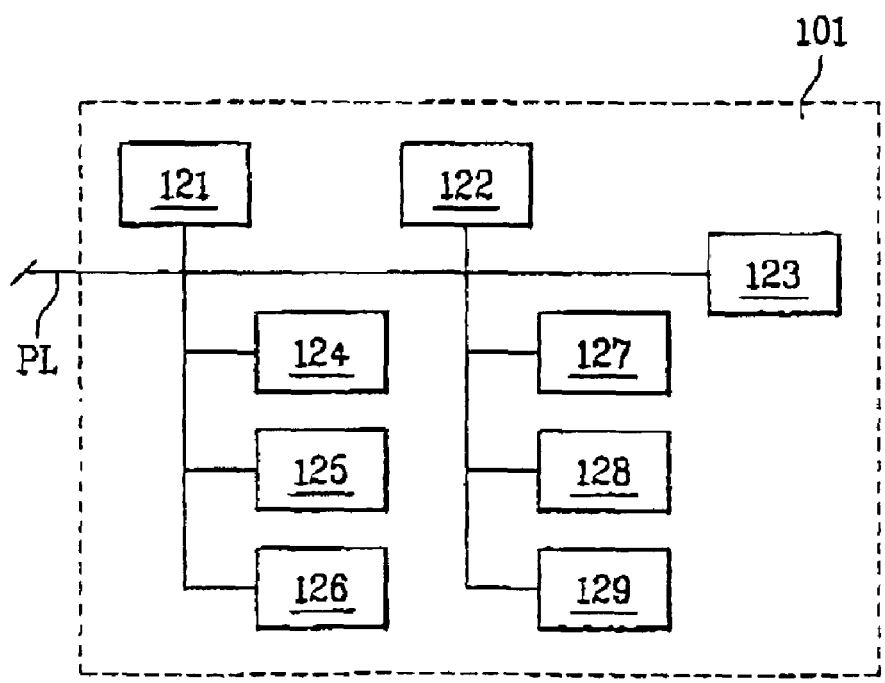
FIG. 3 illustrates a schematic block diagram of a second subnet within the communication network shown in FIG. 1.

FIGS. 1 and 3 schematically illustrate the communication network to which the present invention is applied and the subnet composing the communication network.

Referring to FIG. 1, reference numerals 100 to 109 represent a plurality of individual subnets connected a communication network via common power lines, PL. Subnets 100-109 are located on the communication network within a range allowing data packets broadcasted from one subnet to be received by another subnet. Thus, subnets 100-109 exist within an open distribution network and the communication range within which the data packets may be broadcasted to other subnets may be referred to as the open communication range (OCR).

Figure 2:
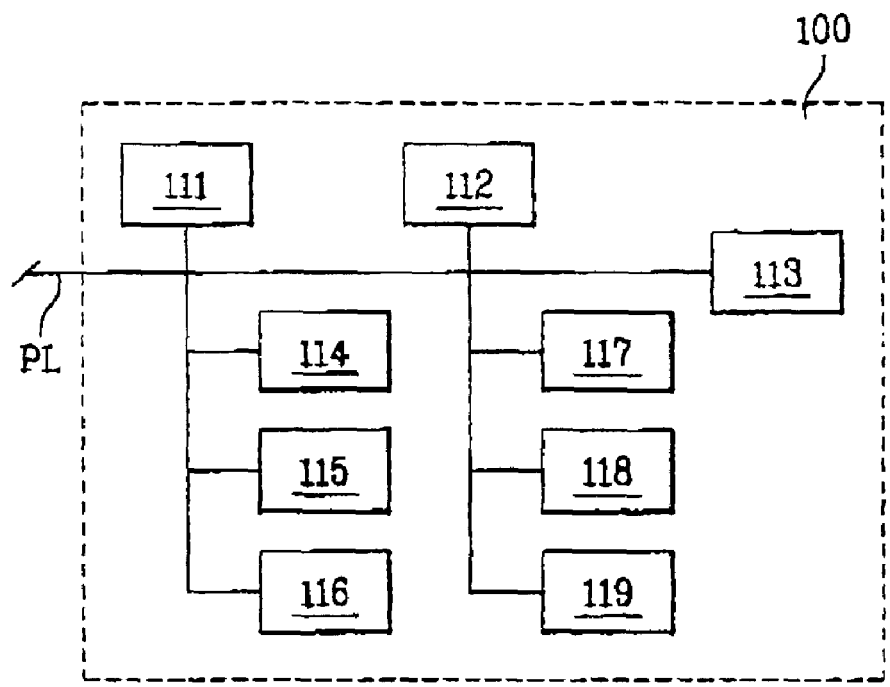
FIG. 2 illustrates a schematic block diagram of a first subnet within the communication network shown in FIG. 1.

Referring to FIG. 2, reference numerals 111 to 119 denote individual nodes within, for example, subnet 100. In one aspect of the present invention, nodes 111-119 may include appliances found within a particular network and capable of receiving power from an indoor power supply. When subnet 100 is created within, for example, a house, nodes 111-119 may include electronic appliances such as a computer, refrigerator, heater, kitchen utensil, or any other electronic appliance designed for use within a kitchen. When subnet is created within, for example, an office, nodes 111-119 may include electronic devices such as a computer, stereo, television, paper shredder, or any other electronic appliance designed for use within an office.

Figure 4:
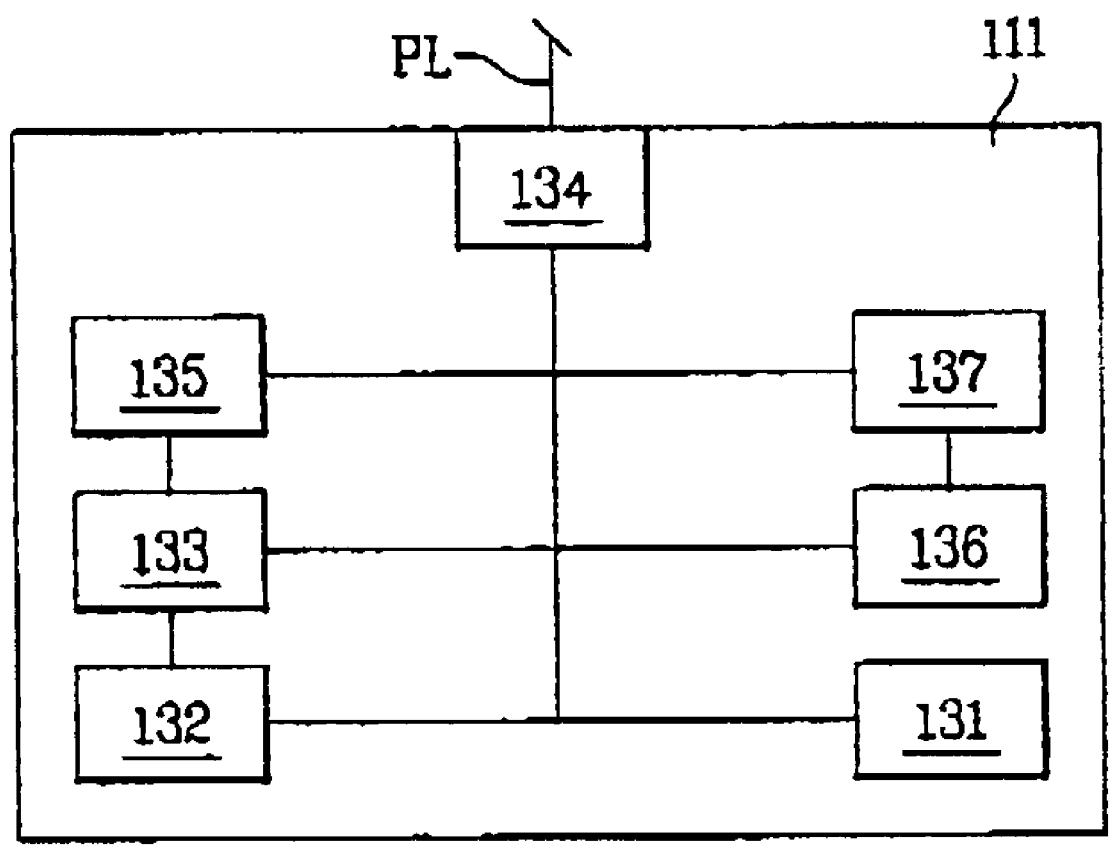
FIG. 4 illustrates a functional block diagram of a communication device used within a node of the subnet shown in FIGS. 2 and 3.
Figure 5:
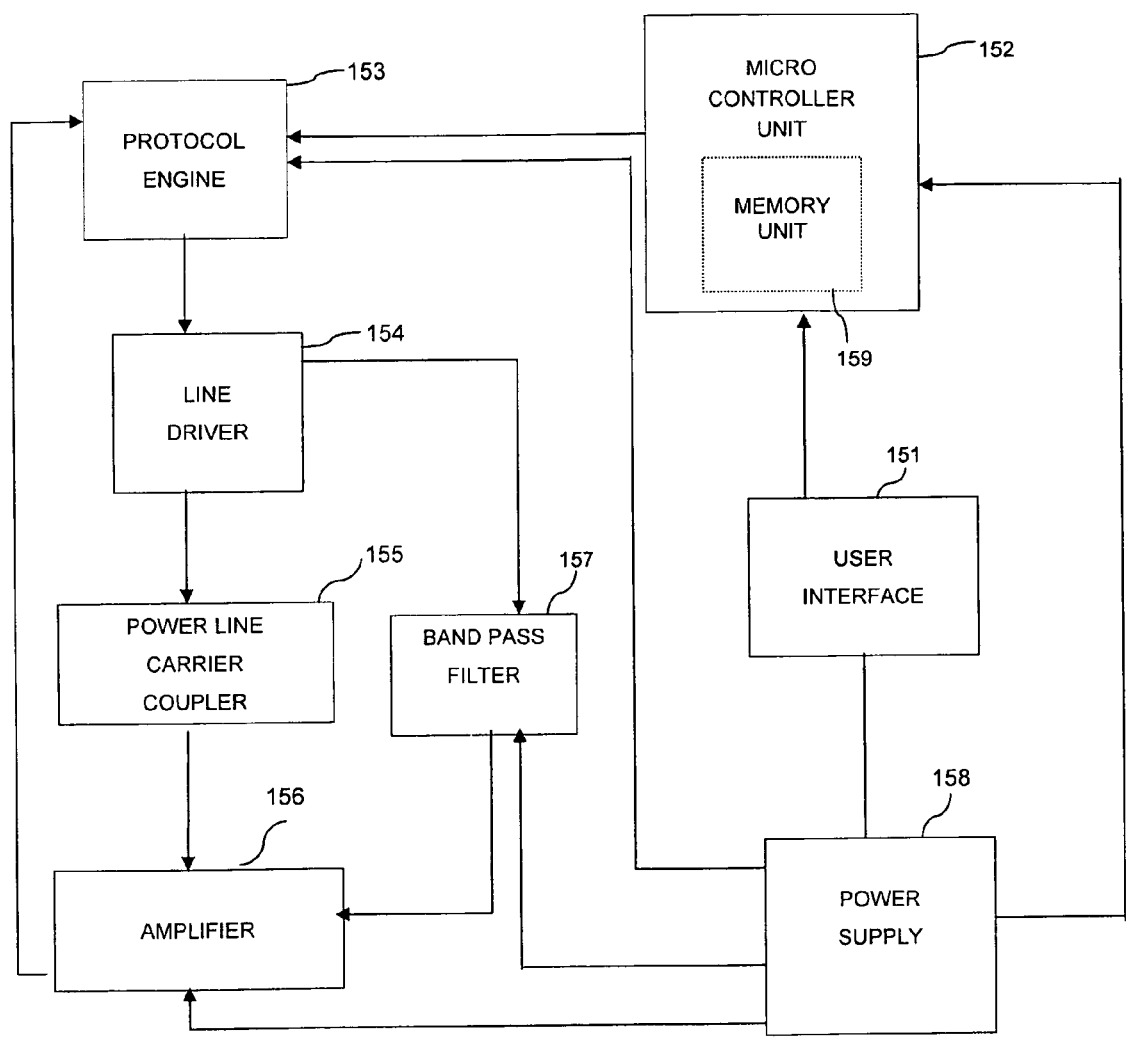
FIG. 5 illustrates a block diagram of components within a communication module embodied as the communication device shown in FIG. 4.
Figure 6:
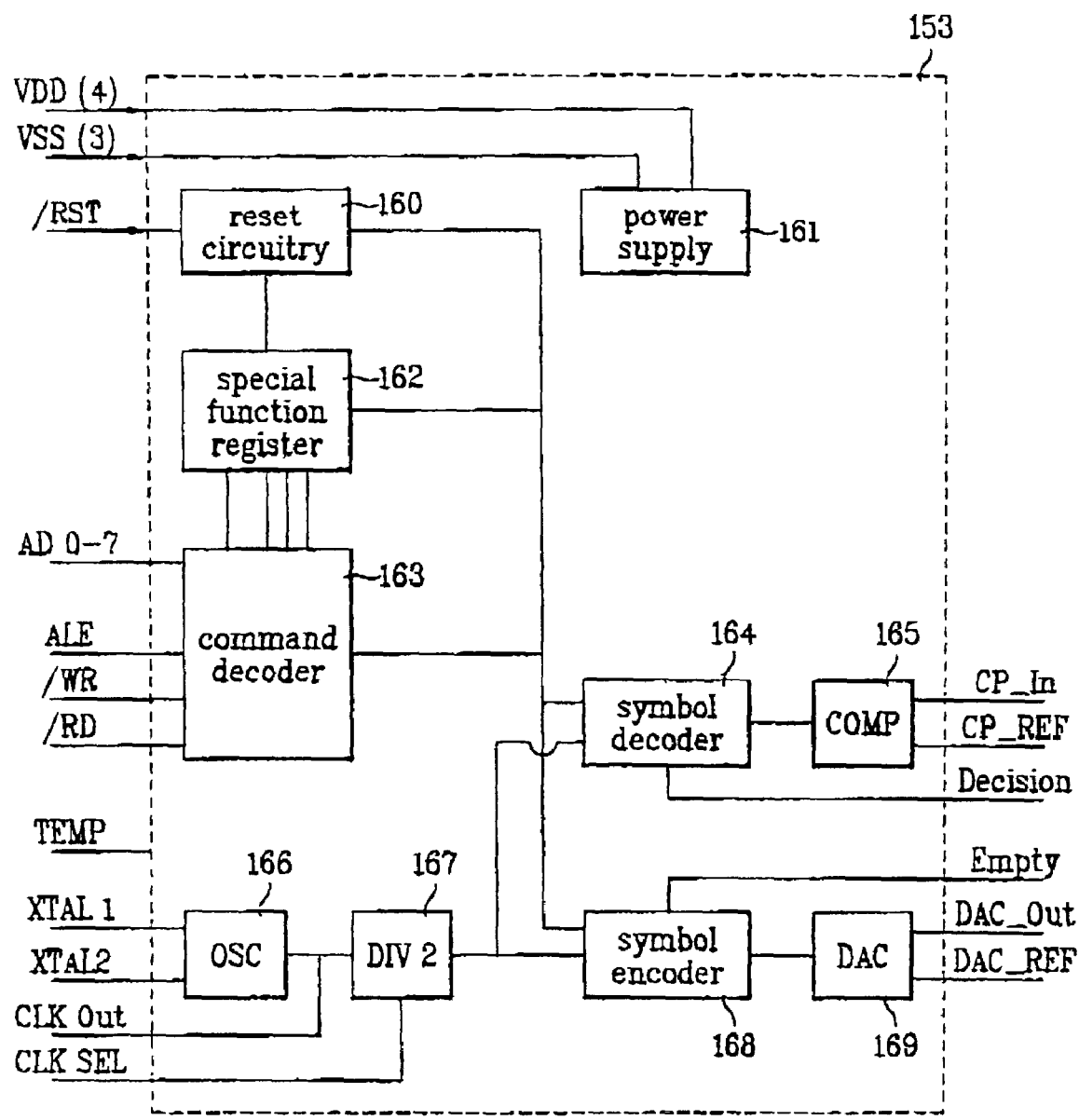
FIG. 6 illustrates a detailed block diagram of a protocol engine within the communication module shown in FIG. 5.

FIG. 4 illustrates a functional block diagram of a communication device used within a node of the subnet shown in FIGS. 2 and 3 to perform a communication process in accordance with the present invention. FIG. 5 of components within a communication module embodied as the communication device shown in FIG. 4. FIG. 6 illustrates a detailed block diagram of a protocol engine within the communication module shown in FIG. 5.

Referring to FIG. 4, each of the nodes may, for example, include a microprocessor 131 for controlling the execution of a communication control program such as that shown in the sequence map and flowcharts of FIG. 7 to FIG. 13; an identifier generating means 132 for generating at least two types of identifiers used to identify its home subnet; an identifier setup means 133 for generating identifiers different from identifiers of outside subnets, separate from its home subnet, on the communication network, wherein the identifiers generated by the identifier setup means 133 may be used to identify its home subnet; an identifier storing means 135 for storing the generated identifiers; a transceiver 134 for broadcasting a data packet including at least one type of identifier among the at least two types of identifiers over the communication network; a comparing means 137 for comparing received identifiers included within a broadcasted data packet with the corresponding identifiers of its home subnet for identifying its home subnet; and an overlap detecting means 136 for determining whether overlap exists. For example, overlap may exist when an outside subnet is identified by the same identifier as the home subnet. The overlap detecting means 136 determines whether overlap exists when one of the at least two types of identifiers received within the broadcasted data packet is identical to a corresponding identifier used to identify the home subnet and the other of the at least two types of identifiers received within the broadcasted data packet is different from a corresponding identifier used to identify the home subnet.

In one aspect of the present invention, after the overlap detecting means 136 determines that overlap exists, the transceiver 134 broadcasts an overlap detection signal over the communication network, wherein the overlap detection signal includes the overlapping identifier.

When the overlap detecting means 136 determines overlap does exist, identifier generating means 132 newly generates the overlapped identifier. When the identifier generating means 132 generates the identifier, the transceiver 134 broadcasts an identifier hail signal that includes an identifier, over the communication network. The identifier setup means 133 modifies any overlapping identifiers that are broadcasted into identifiers that may be acknowledged as unique by nodes in outside subnets on the communication network.

The comparing means 137 compares the identifier received in the broadcasted identifier hail signal with the identifier that identifies its home subnet. When the identifier received in the broadcasted identifier hail signal is identical to the identifier that identifies its home subnet, the transceiver 134 broadcasts a non-acknowledgment signal over the communication network. When the transceiver 134 receives a non-acknowledgment signal transmitted in response to its broadcasted identifier hail signal, the identifier generating means 132 generates a new identifier.

When the identifier setup means 133 modifies the identifier, the transceiver 134 broadcasts an identifier modification command including the modified identifier and the non-modified identifier on the communication network.

When a node is activated (e.g., when it is powered on), the transceiver 134 broadcasts a starting signal over the communication network. The starting signal includes at least two types of identifiers. The comparing means 137 compares the identifiers received in the broadcasted starting signal with corresponding identifiers identifying its home subnet. When a part of the identifiers received in the broadcasted starting signal is identical to the corresponding identifier identifying its home subnet and the remaining part of the identifiers received in the broadcasted starting signal is different from the corresponding identifier identifying its home subnet, the transceiver 134 broadcasts an identifier modification command over the communication network.

When the transceiver 134 receives a identifier modification command, the comparing means 137 compares the identifiers received within the broadcasted identifier modification command with the corresponding identifiers identifying its home subnet. When a part of the identifiers received in the broadcasted identifier modification command is identical to the corresponding identifier identifying its home subnet and the remaining part of the identifiers received in the broadcasted identifier modification command is different from the corresponding identifier identifying its home subnet, the identifier setup means 133 modifies its different identifier into the corresponding identifier received in the broadcasted identifier modification command.

When the transceiver 134 receives the identifier hail signal, the comparing means 137 compares the identifiers received in the broadcasted identifier hail signal with the corresponding identifiers identifying its home subnet. When the identifier received in the broadcasted identifier hail signal is different from the identifier identifying its home subnet, the transceiver 134 maintains a non-responsive state. When the transceiver 134 does not receive a non-acknowledgment signal in response to its broadcasted identifier hail signal within a predetermined amount of time after broadcasting the identifier hail signal, the identifier setup means 133 determines that the identifiers within the broadcasted identifier hail signal may be acknowledged as unique by nodes in outside subnets on the communication network.

Referring to FIG. 5, a communication module embodied as the communication device of FIG. 4 processes transmitted/received data packets and includes a protocol engine (e.g., ZCT-2096) 153, a line driver 154 for receiving a signal from the protocol engine 153 and for outputting the signal to be transmitted through a power line, a power line carrier coupler 155 for transmitting the signal from the line driver 154 to the power line, and a receiving amplifier 156 for amplifying the signal from the power line and transmitting it to the protocol engine 153. In one aspect of the present invention, some of the signals transmitted from the line driver 154 to the power line carrier coupler 155 may be transmitted to the receiving amplifier 156 through a bandpass filter 157. The operation of the protocol engine 153 is controlled by a micro controller unit 152 for executing a logic control program. The micro controller unit 152 may include a memory unit 159 that stores a control input value inputted through a user interface 151 or transmitted/received data packets or may be used as a communication buffer. Power supply 158 provides driving power suitable for operating the components within the communication device. In one aspect of the present invention, user interface 151 and the micro controller unit 152 communicate with each other using, for example, an RS232 connection. Devices and components of appropriate specifications may easily be purchased and combined to form the aforementioned components of the communication device except for the protocol engine 153.

FIG. 6 is a detailed block diagram illustrating the protocol engine 153.

Referring to FIG. 6, the protocol engine 153 may include a special function register 162 provided for storing generated identifiers; a comparator 165 provided for comparing information included in received signals with corresponding comparison reference values; a symbol decoder 164 provided for outputting a decision value according to the comparison result of the comparator 165; a symbol encoder 168 for encoding data to be transmitted through the power line; a digital to analog converter 169 provided for converting output from the symbol encoder 168; a divider 167 provided for dividing a clock signal from an oscillator 166 and for outputting the clock signal according to a clock select value and providing the clock signal to the symbol encoder 168; reset circuitry 160 provided for resetting previously generated identifier values stored in the special function register 162; a command decoder 163 provided for controlling the operation of the various components of the protocol engine 153; and a power supply 161 provided for supplying power to the protocol engine 153.

When the communication device of the appliance used as the node is manufactured in form of the communication module of FIG. 5 and FIG. 6, the function of the microprocessor 121 is performed by the micro controller unit 152, the micro controller unit 152 determines processing of the received data according to the decision value of the symbol decoder 164 and the comparator 165, and the special function register 162 stores a setup value of the data to be compared by the comparator 165. The function of starting means 122 is performed either via interaction with a user through the user interface 151 or via the logic control program executed by the micro controller unit 152.

Various processes by which, for example, a first node 111, shown in FIG. 2, communicates with other nodes 112 to 119 within first subnet 100 will now be described with reference to FIG. 7 to FIG. 13.

Figure 7:
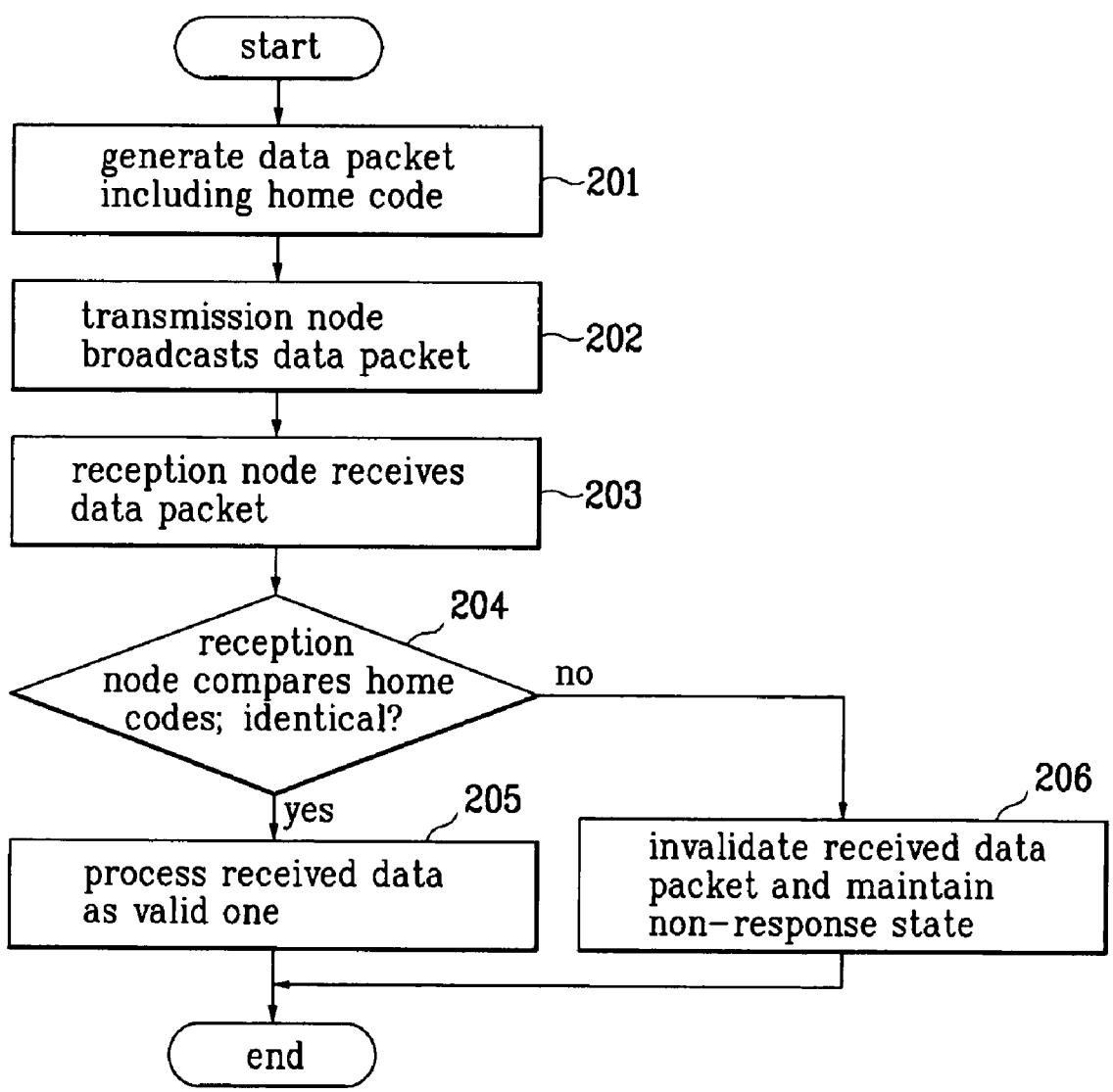
FIG. 7 illustrates a flowchart of a general communication process flow on the communication network shown in FIG. 1.
Figure 8:
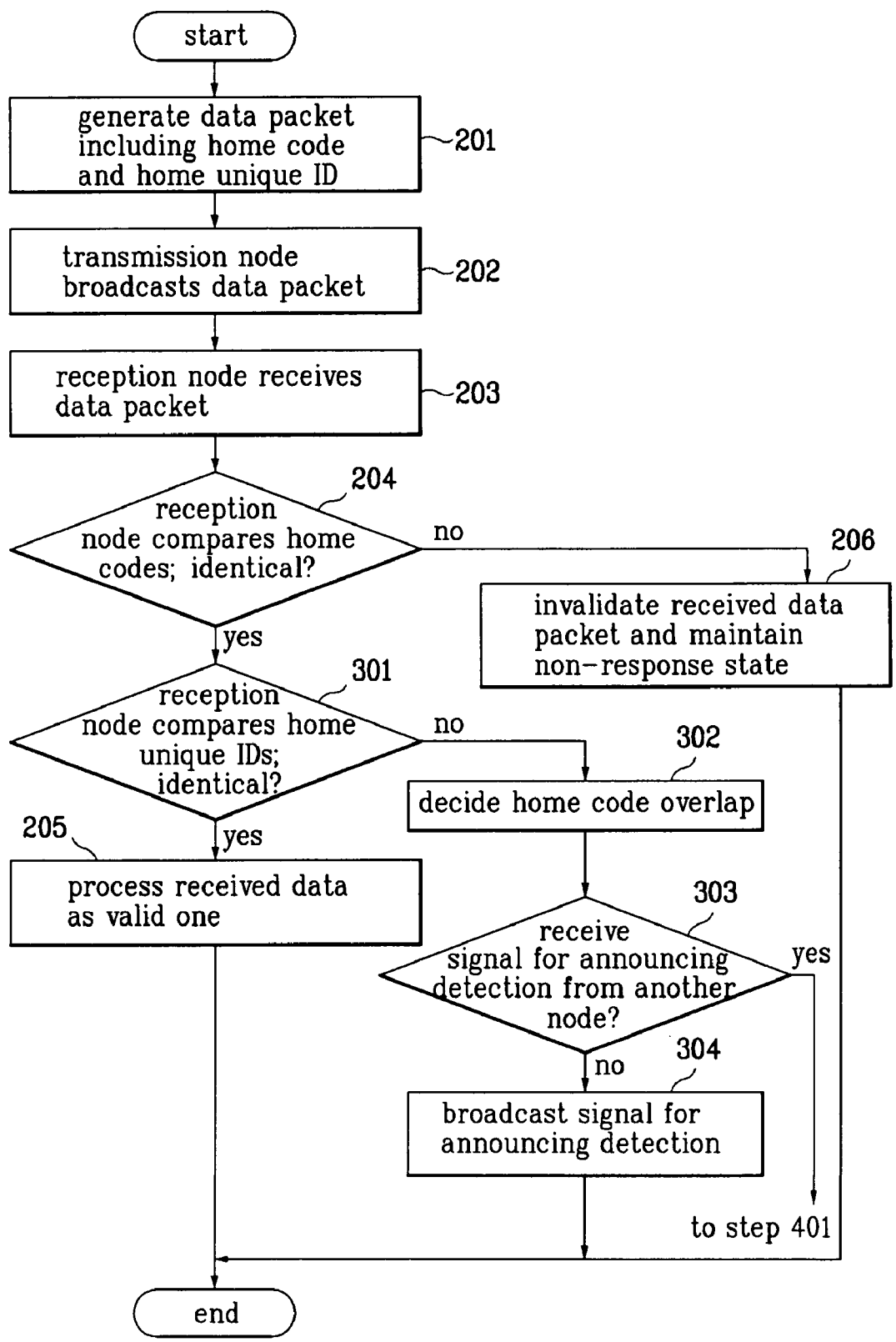
FIG. 8 illustrates a flowchart of a process flow for detecting identifier overlap on the communication network shown in FIG. 1.
Figure 9:
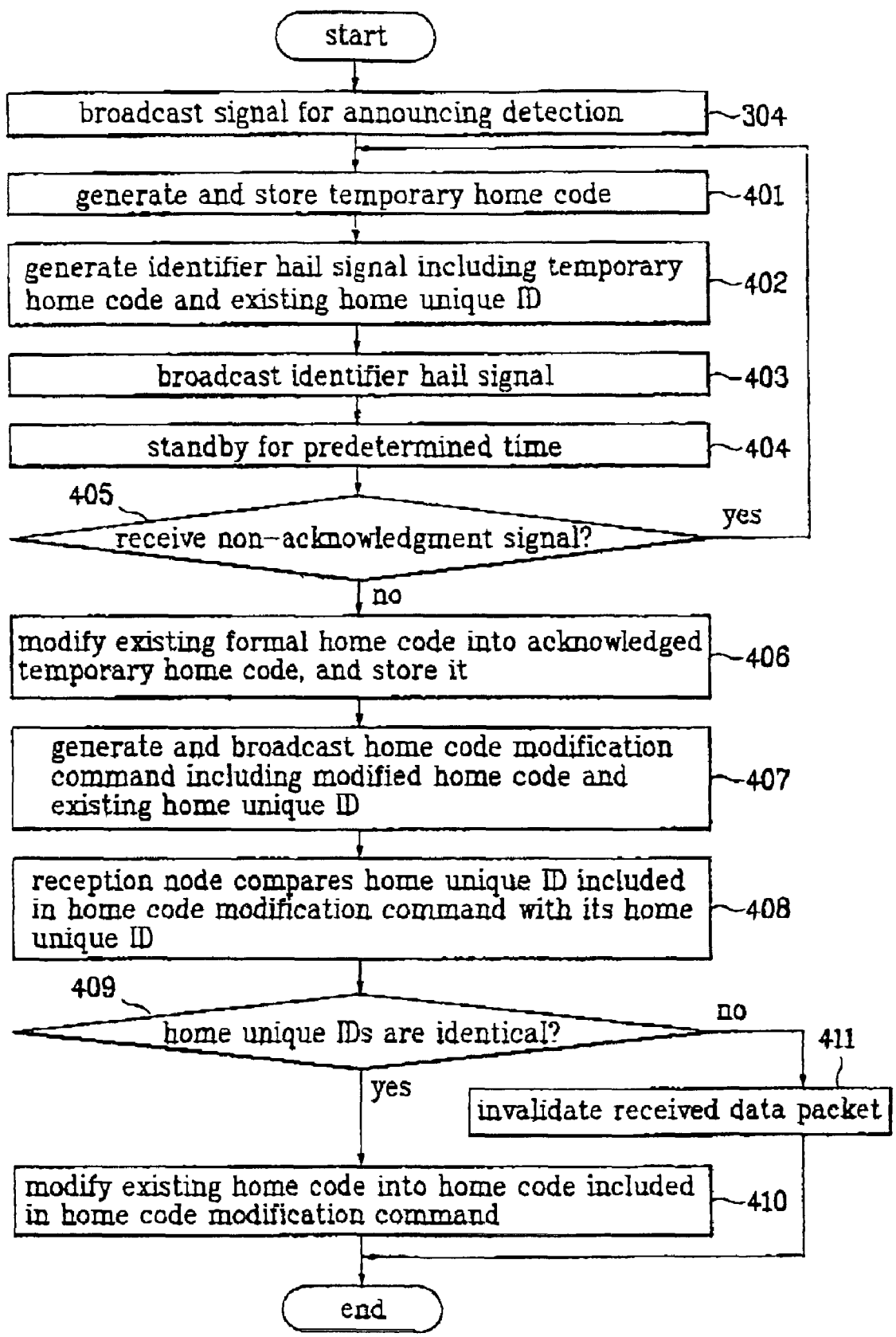
FIG. 9 illustrates a flowchart of a process flow for modifying identifiers of nodes within the subnet shown in FIG. 3.
Figure 10:
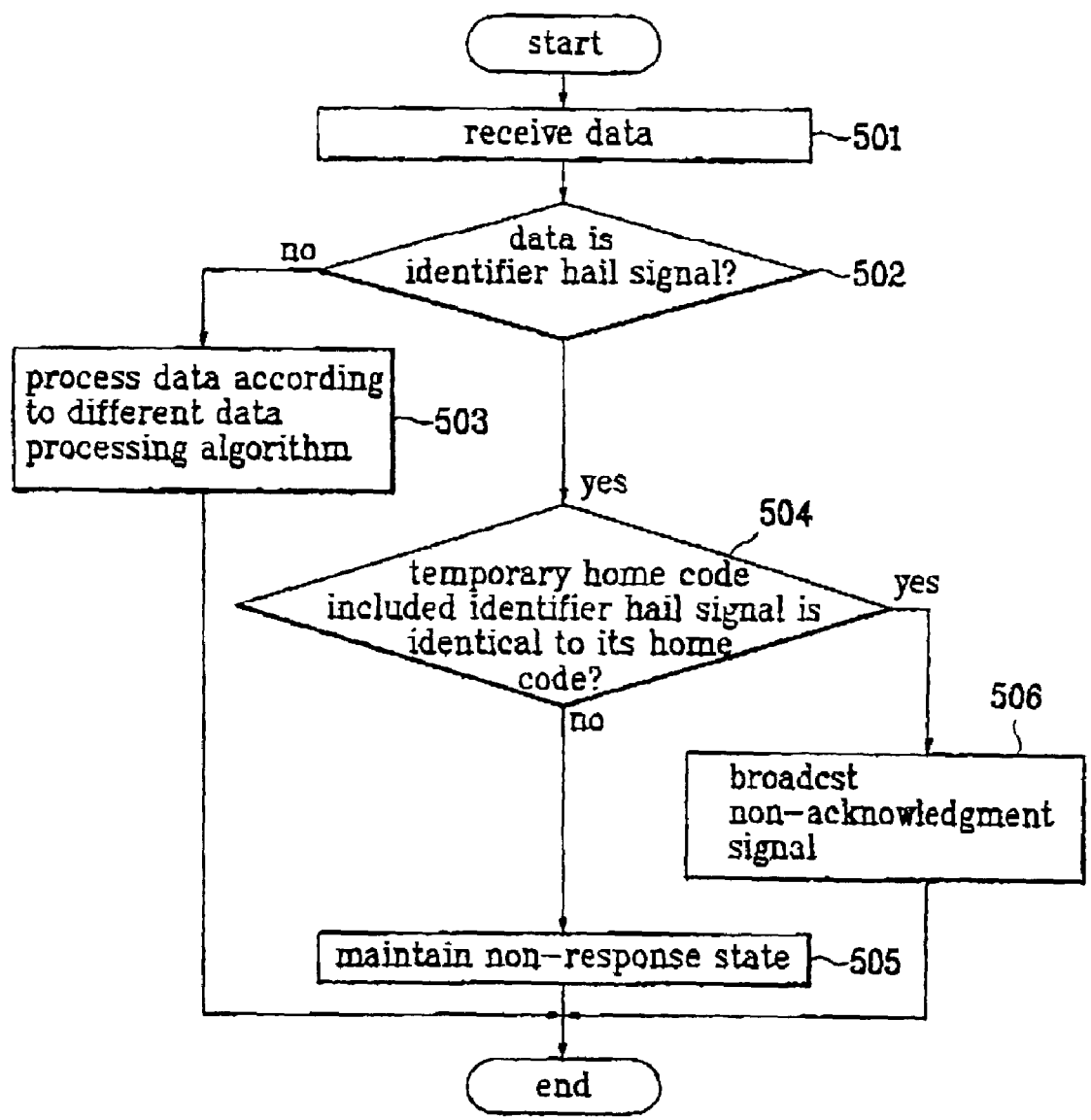
FIG. 10 illustrates a flowchart of a process flow for preventing identifier overlap between nodes of different subnets when one node of the subnet shown in FIG. 3 modifies its identifier.
Figure 11:
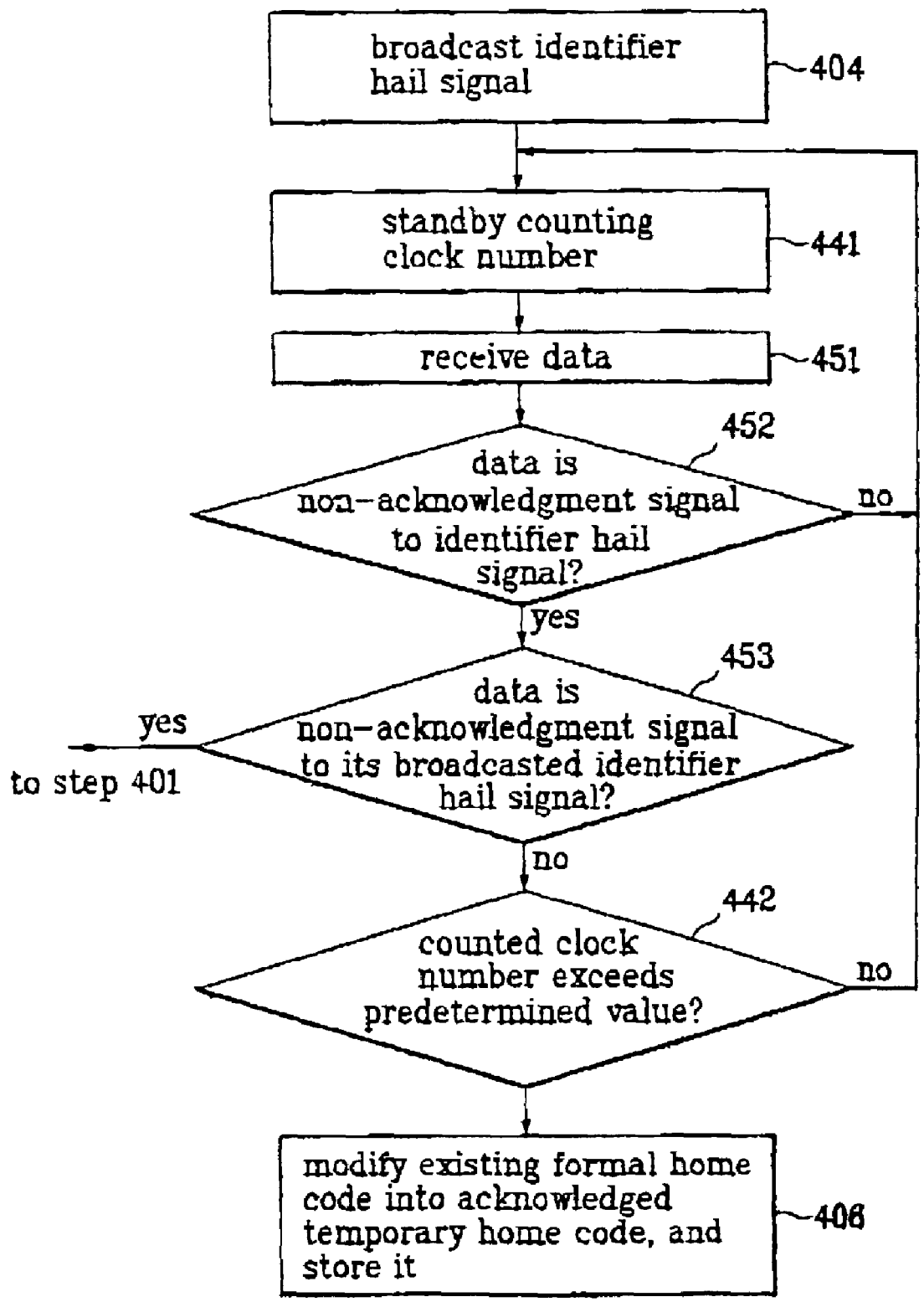
FIG. 11 illustrates a detailed flowchart of a part of the process shown in FIG. 9.
Figure 12A:
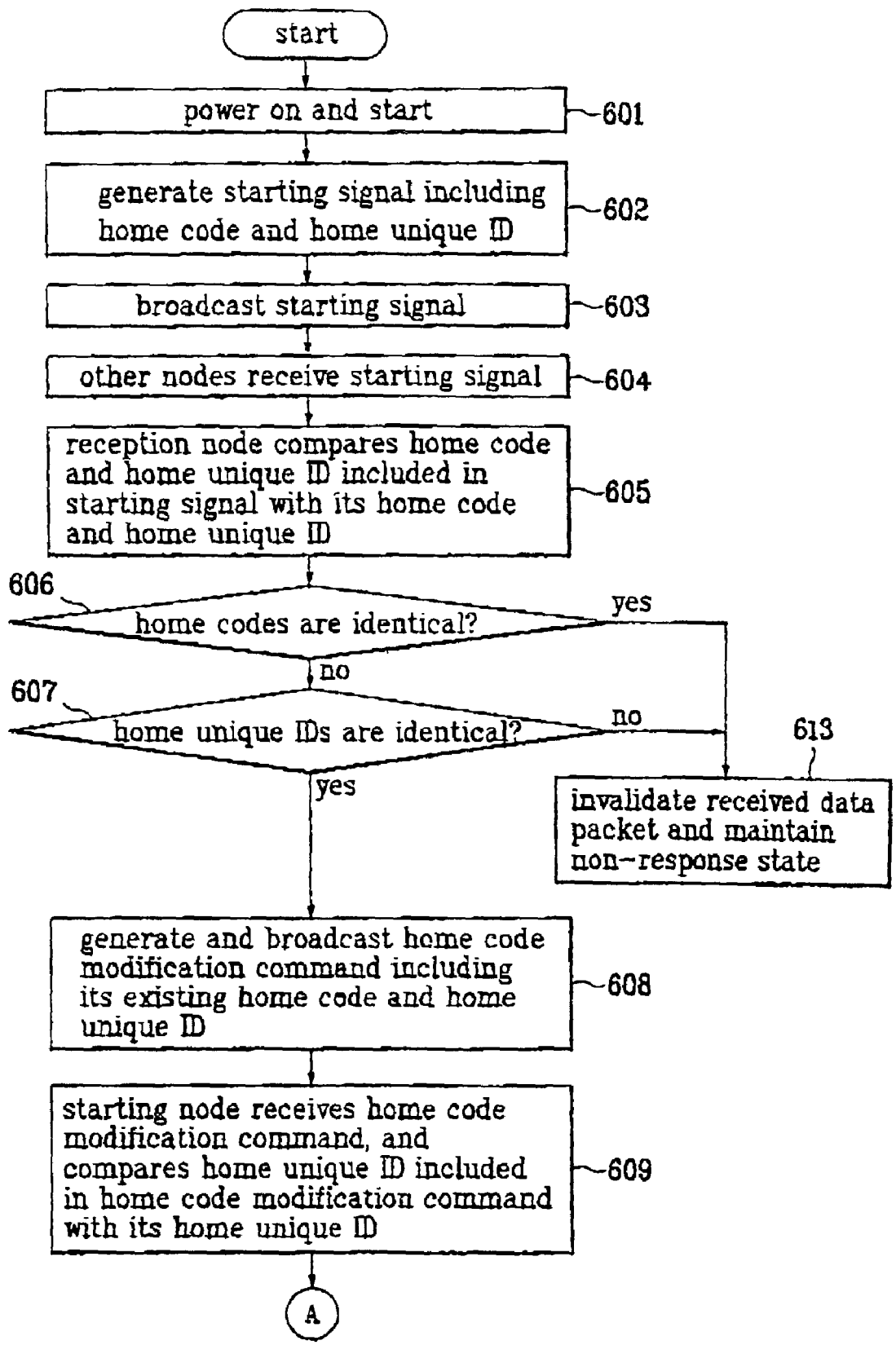
FIGS. 12A and 12B illustrates a flowchart of a process flow for a node that succeedingly modifies an identifier identifying the subnet shown in FIG. 3.
Figure 12B:
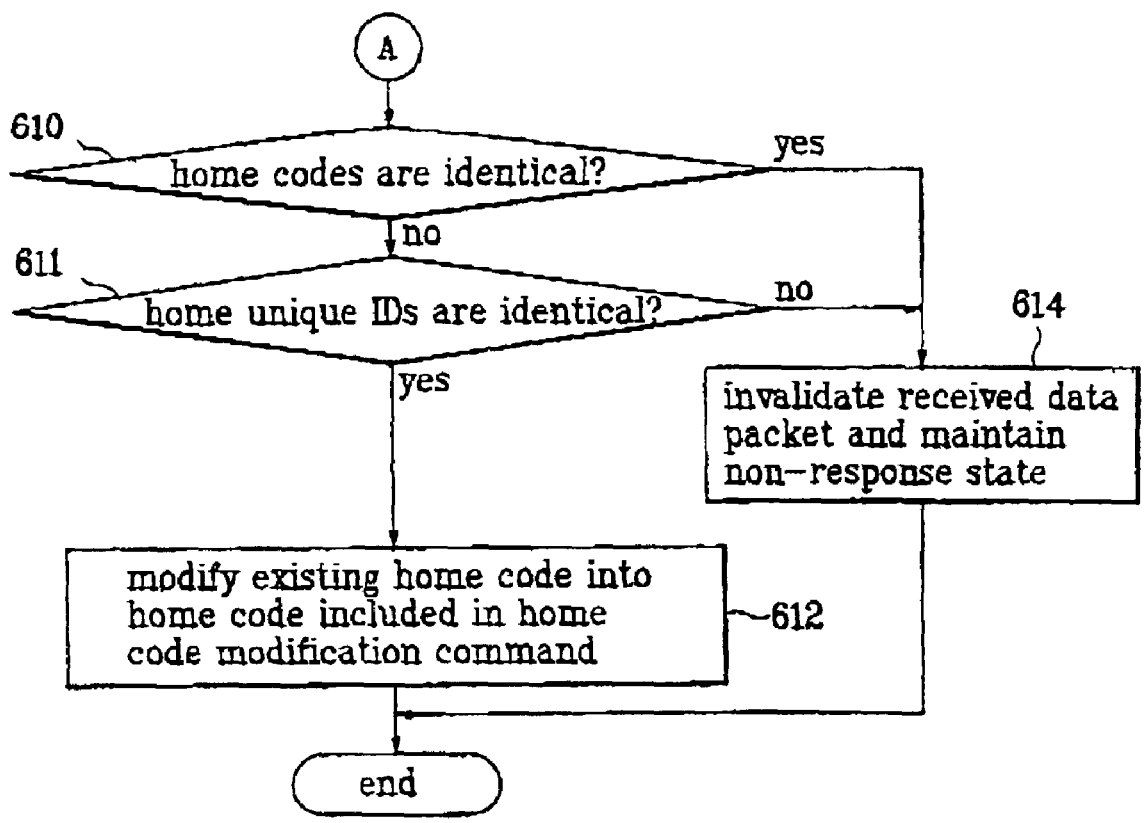

FIG. 7 illustrates a flowchart of a general communication process flow. FIG. 8 illustrates a flowchart of a process flow for detecting identifier overlap. FIGS. 9 to 11 illustrate flowcharts of process flows for modifying an identifier. FIGS. 12A and 12B illustrate a flowchart of a succeeding modifying process flow. FIGS. 13A through 13D illustrate a time series sequence map showing a data processing sequence between the nodes of the first subnet 100 and the second subnet 101 in a general communication process, a process for detecting overlap, a process for modifying a identifier, and a succeeding modifying process.

As illustrated in FIG. 7 and FIGS. 13A-D, when first node 111 within first subnet 100 broadcasts data packets to other nodes 112 to 119, in a general communication process, first node 111 first generates and stores information to be included within the broadcasted data packets (step 201). For example, the information to be included within the broadcasted data packets may include a home code (i.e., a first identifier type) of the first subnet 100. Subsequently, first node 111 broadcasts the data packet over the communication network using a transceiver 134 (step 202). A unique home ID (i.e., a second identifier type) for identifying the first subnet 100 may optionally be included within the data packet. Generally, when broadcasted data packets are received by any node, the node receiving the broadcasted data packet may be referred to as a reception node. When broadcasted data packets are meant to be selectively transmitted to a specific node (i.e., a specific reception node) within the first subnet 100, a node identifier, uniquely identifying the specific reception node, may be included within the broadcasted data packet. However, when broadcasted data packets are meant to be selectively transmitted to a group of nodes (i.e., general reception nodes) within the first subnet 100, predetermined wild card, area, or group codes may be included within the broadcasted data packet. Broadcasted data packets are received by all nodes of the subnets on the communication network within the open communication range (step 203). Accordingly, each of the nodes within the open communication range compares the home code included within the broadcasted data packet with home codes that identify their own home subnets using a comparator 137 (step 204). After the nodes receiving the broadcasted data packet determine that the home code broadcasted and the home code that identifies their home subnet are identical, the information within the data packet may be validated.

For example, in the general communication process, although the data packet broadcasted by first node 111 of the first subnet 100 reaches nodes 121 to 129 of second subnet 101, nodes 121 to 129 determine that information within the broadcasted data packet is invalid and maintain a non-responsive state (step 206) with respect to first node 111. Meanwhile, nodes 112 to 119 of the first subnet 100 determine that information within the broadcasted data packet is valid and subsequently process it (step 205).

Referring to FIGS. 13A-D, when the home code of the second subnet 101 is identical to the home code of the first subnet 100, nodes 121 to 129 of the second subnet 101 may incorrectly determine the data packet broadcasted by the first node 111 as being valid. This incorrect determination by the nodes of the second subnet may be deleterious because information included within broadcasted data packets were not meant to effect management and control of the nodes 121 to 129 of the second subnet 101. Accordingly, when data packets are broadcasted from one subnet to other subnets that have identical home codes (e.g., where home code overlap exists), the broadcasted data packets may further include the unique home ID of the broadcasting subnet to reduce incorrect determinations by other subnets. Additionally, since home code overlap may introduce problems, the process for detecting home code overlap may be periodically performed. Accordingly, in detecting home code overlap, a node may broadcast a data packet including the home code and the unique home ID using the transceiver 134.

Figure 13A:
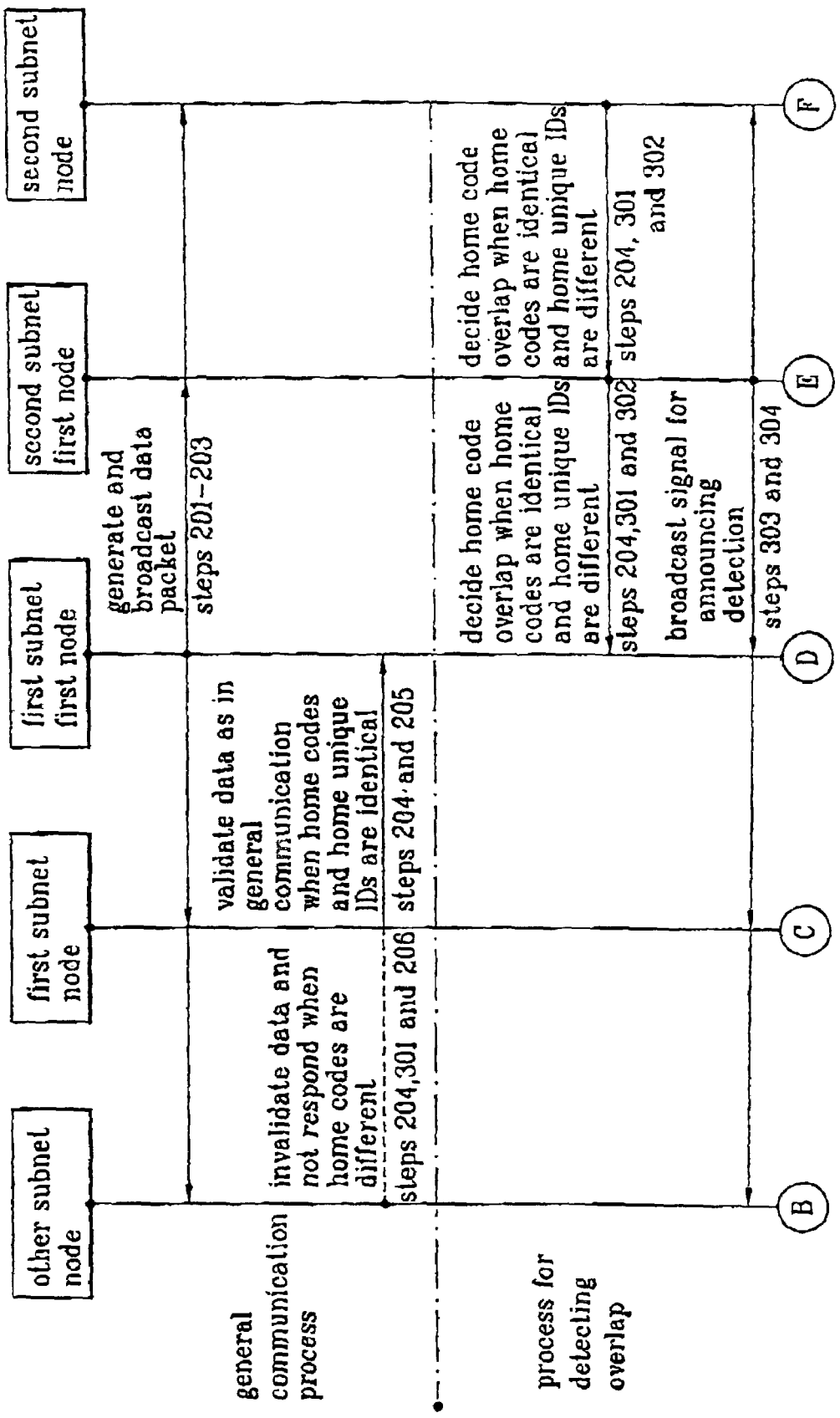
Figure 13D:
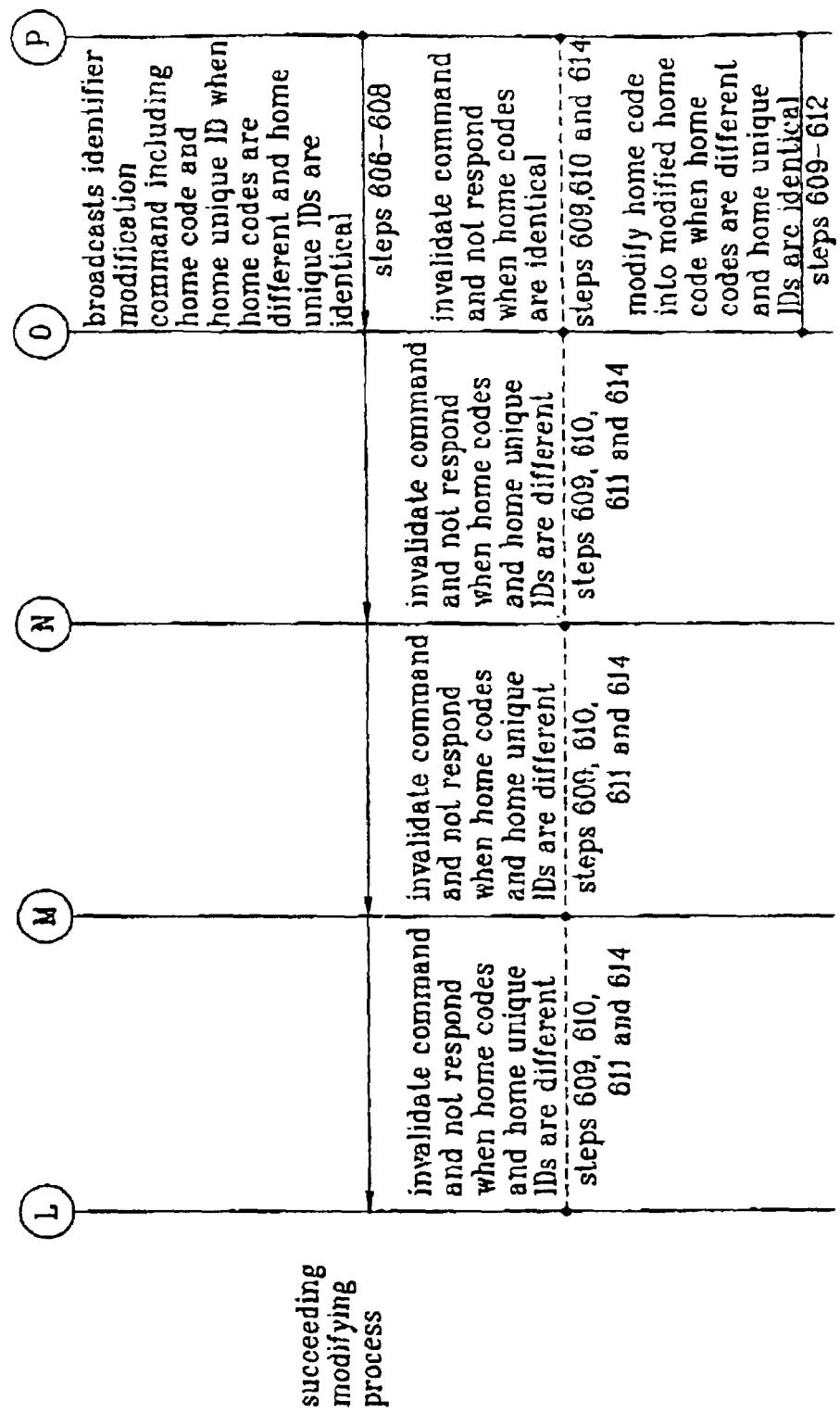

Referring now to FIGS. 8 and 13A, in a process for detecting identifier overlap, first node 111 of the first subnet 100, for example, generates and broadcasts a data packet including the home code and the unique home ID, as shown in step 201, over the communication network using the transceiver 134 (step 202). The nodes of the subnets on the communication network within the open communication range receive the broadcasted data packet (step 203) and compare the home code and the unique home ID received within the broadcasted data packet with the home codes and unique home IDs that identify their own home subnets.

If, for example, the home code of the second subnet 101 is identical to the home code of the first subnet 100, it is generally considered improbable that the unique home ID of the second subnet 101 is identical to the unique home ID of the first subnet 100. In one aspect of the present invention, the unique home ID may, for example, include a serial number of the node broadcasting the data packet or be generated by combining the product serial number and the home code of the subnet. Further, the unique home ID may be generated using random numbers.

If, as nodes 121 to 129 of the second subnet 101 compare the home code and the unique home ID received in the broadcasted data packet with their own home codes and unique home IDs, it is determined that their home codes are identical to the broadcasted home codes while their unique home IDs are different from the broadcasted home codes, nodes 121 to 129 determine that more than one subnet existing within their open communication range are identified by identical home codes.

Still referring to FIGS. 8 and 13A, when it is determined that the home code included within the broadcasted data packet is different from the home code of the reception node (step 204), the reception node invalidates the information within the broadcasted data packet and maintains the non-responsive state with respect to the broadcasting node (step 206). When the home code within the broadcasted data packet is identical to the home code of the reception node, the unique home ID included within the broadcasted data packet is compared with the unique home ID of the reception node (step 301). When it is determined that the unique home ID included within the broadcasted data packet is identical to the unique home ID of the reception node, the reception node validates information within the broadcasted data packet and processes it (step 205). If the home codes of the broadcasted data packet and reception node are identical but the unique home IDs are different, the reception node determines that the subnet of the node broadcasting the data packet (e.g., the first subnet 100) is identified by the same home code (step 302).

Upon determining that the same home code identifies more than one subnet, the reception node generates and broadcasts an overlap detection signal. It should be noted that nodes receiving the broadcasted overlap detection signal do not broadcast the overlap detection signal. The node broadcasting the overlap detection signal modifies the overlapping identifier, as will be discussed in greater detail below, but the nodes receiving the broadcasted overlap detection signal do not modify the overlapping identifier. By limiting the number of nodes that modify overlapping identifiers, confusion may be minimized when many nodes modify overlapping identifiers at the same time.

Referring to FIGS. 9 and 10, when nodes 121 to 129 of the second subnet 101, receiving the data packet broadcasted by the first node 111 of the first subnet 100, detect home code overlap (step 302), the first node 121, for example, confirms whether it has received an overlap detection signal from other nodes 122 to 129 (step 303). If it is confirmed that the first node 121 has not received an overlap detection signal, the first node 121 generates and broadcasts an overlap detection signal (step 304) and modifies the overlapping identifier.

When of the second subnet 101 detect home code overlap (step 302), they confirm whether they have received an overlap detection signal from the other nodes (step 303) by determining whether they have received an overlap detection signal from the first node 121. Accordingly, nodes 122 to 129 do not broadcast an overlap detection signal, invalidate the data packet broadcasted by the first node 111 of the first subnet, maintain the non-responsive state with respect to first node 111, and may modify the overlapping identifier (step 304 of FIG. 9).

Accordingly, in one aspect of the present invention, nodes 121 to 129 of the second subnet 101 may modify the overlapping identifier, but only the node broadcasting overlap detection signal, e.g., node 121, modifies the overlapping identifier. In another aspect of the present invention, a predetermined master node is included within the second subnet 101 where other nodes within the subnet are not able to modify the overlapping identifier. Accordingly, an overlap detection signal need not be broadcasted and the reception of an overlap detection signal need not be confirmed.

The process for modifying an overlapping identifier may be similar to a process used in the creation of identifiers via an identifier hail signal that is used to create a subnet as disclosed by the inventors in copending U.S. patent application Ser. No. 10/244,431, entitled "SUBNET OF POWER LINE COMMUNICATION NETWORK, METHOD FOR SETTING UP THE SAME, ELECTRONIC APPLIANCE CONNECTED TO THE SAME, AND COMMUNICATION MODULE USED IN ELECTRONIC APPLIANCE" filed on the same date herewith for which is hereby incorporated by reference for all purposes as if fully set forth herein. The process for modifying the identifier will now be described in detail with reference to FIG. 9 to FIG. 11 and FIG. 13A-D.

FIG. 9 is a flowchart showing the process for modifying the identifiers in the nodes 121 to 129 of the second subnet 101, and FIG. 10 is a flowchart showing the process of a node of a different subnet receiving a broadcasted data while the second subnet 101 performs the process for modifying the identifier.

As illustrated in FIG. 9, the identifier generating means 132 within first node 121 of second subnet 101 broadcasts the overlap detection signal (step 304), generates a first identifier type called a home code, and stores the first identifier type in the identifier storing means 135 as a temporary home code (step 401). After the temporary home code is stored, first node 121 generates an identifier hail signal that includes the temporary home code and an existing unique home ID (step 402) and broadcasts the identifier hail signal using transceiver 134 (step 403). The temporary home code and the temporary unique home ID included within the broadcasted identifier hail signal may be located in predetermined portions of the broadcasted identifier hail signal. In one aspect of the present invention, a header of the data packet includes information identifying the broadcasted signal as an identifier hail signal. After the identifier hail signal is broadcasted, first node 121 maintains a standby state for a predetermined amount of time (step 204), and determines whether a non-acknowledgment signal, transmitted in response to its broadcasted identifier hail signal, is received (step 405).

As shown in FIG. 10, the broadcasted identifier hail signal is received by all powered-on nodes of subnets existing within the open communication range (step 501). Reception nodes analyze the header of the data packet and determine whether the data packet includes an identifier hail signal (step 502). If it is determined that the data packet does not include an identifier hail signal, the reception node processes information within the data packet according to a data processing algorithm (step 503). If it is determined that the data packet does include an identifier hail signal, the reception node determines whether the temporary home code included in the broadcasted identifier hail signal is identical to a home code that identifies its own home subnet (step 504). If it is determined that the two home codes are identical, the transceiver of the reception node broadcasts a non-acknowledgment signal (step 506). If it is determined that the two home codes are different, the reception node maintains the non-responsive state with respect to the node and does not broadcast a non-acknowledgment signal (step 507). In one aspect of the present invention, the non-acknowledgment signal may include the temporary home code and/or unique home ID included in the broadcasted identifier hail signal.

FIG. 11 is a detailed flowchart showing the processes of steps 404 and 405 of FIG. 9.

Referring to FIG. 11, after broadcasting the identifier hail signal, first node 121 counts a number of clock signals and maintains the standby state for a predetermined amount of time (step 441). When node 121 receives data packets broadcasted over the communication network (step 451), first node 121 analyzes the header of the received data packet and determines whether the data packet includes a non-acknowledgment signal transmitted in response to its broadcasted identifier hail signal (step 452). If it is determined that the data packet does not include any non-acknowledgement signal, first node 121 ignores the data packet and maintains the standby state (step 441). If it is determined that the data packet does include a non-acknowledgement signal, first node 121 determines whether the received data packet includes the non-acknowledgement signal transmitted in response to its broadcasted identifier hail signal (step 453). If it is determined that the data packet does include a non-acknowledgment signal transmitted in response to its broadcasted identifier hail signal (step 452), first node 121 compares the temporary home code received within the broadcasted data packet with its own temporary home code stored in the identifier storing means 135 and determines whether they are identical (step 453). If it is determined that the two home codes are identical, first node 121 returns to step 401 of FIG. 9, generates a new home code using the identifier generating means 132, and stores the new home code in the identifier storing means 135 as a temporary home code (step 401) and the succeeding processes are performed as explained above. If it is determined that the two home codes are not identical, first node 121 waits to receive a non-acknowledgement signal in response to its broadcasted identifier hail signal. The aforementioned procedure may be repeatedly performed as required until node 121 fails to receive a non-acknowledgement signal in response to its broadcasted signal.

If it is determined that first node 121 has not received a non-acknowledgment signal transmitted in response to its broadcasted identifier hail signal within the predetermined amount of time after broadcasting its identifier hail signal (e.g., after the number of clock signals counted in step 442 exceeds a predetermined value), the procedure is finished.

Accordingly, when first node 121 does not receive a non-acknowledgment signal including its temporary home code within the predetermined amount of time (step 442), first node 121 determines that the nodes of the subnets on the communication network within the open communication range are not represented by its generated temporary home code, creates that temporary home code as a formal home code, and stores the formal home code in the identifier storing means 135 (step 406).

After the identifier of first node 121 is modified, the identifier of the other nodes 122 to 129 are correspondingly modified (steps 407 to 411). In so doing, first node 121 generates and broadcasts a home code modification command on the communication network by using the transceiver 134 (step 407). Accordingly, the home code modification command includes the modified home code and the existing unique home ID and is transmitted to all the nodes existing within the open communication range. Subsequently, the reception node compares the unique home ID included within the broadcasted home code modification command with its own unique home ID (step 408). If it is determined that the two unique home IDs are identical (step 409), the reception node modifies its existing home code into the home code received within the broadcasted home code modification command (step 410). If it is determined that the two unique home IDs are not identical (step 409), the reception node invalidates information received within the data packet (step 411). Unique home IDs of nodes in different subnets are different from each other, while unique home IDs of nodes in the same subnet are identical to each other. Thus, all the nodes of, for example, the second subnet 101 may be identified by the same home code.

While the process of creating the subnet may require that the home code and the unique home ID be included within the identifier hail signal and acknowledged, the process of modifying the identifier according to the present invention requires only the home code be included within the identifier hail signal and modified upon acknowledgment and the unique home ID is used as it is. Only the home code is required to be included and modified within the identifier because it is improbable that overlap in unique home IDs exists between different subnets.

When first node 121 of second subnet 101 broadcasts the home code modification command (step 407), powered-on nodes of the second subnet 101 modify their home code. Powered-off nodes of the second subnet 101, however, maintain their unmodified home codes. After these powered-off nodes are powered-on, they still cannot communicate with other nodes in their subnet until a succeeding modifying process is performed.

FIGS. 12A and 12B illustrate a succeeding modifying process in accordance with the principles of the present invention.

Referring to FIGS. 12A-B, when a powered-off node requiring a modified home code is powered on (step 601), the node generates (step 602) and broadcasts a starting signal on the communication network (step 603). The starting signal may include the unmodified home code and unique home ID. Alternatively, a reset signal may be generated and broadcasted upon operation of a reset switch. The reset signal may include the unmodified home code and the unique home ID. Either the broadcasted starting or reset signals (collectively referred to as 'starting signal') are received by the nodes of all subnets existing within the open communication range (step 604). Each reception node compares the home code and the unique home ID included within the broadcasted starting signal with its own home code and unique home ID (step 605). When the home codes are identical (step 606) or when the home codes and the unique home IDs are all different (step 607), the node invalidates the received data packet and maintains a non-responsive state (step 613). When the unique home IDs are identical and the home codes are different (step 607), the reception node generates the home code modification command including its modified home code and unique home ID and broadcasts it on the communication network (step 608). The broadcasted home code modification command is received by the nodes of all subnets existing within the open communication range. Each reception node then compares the unique home ID included in the broadcasted home code modification command with its own unique home ID (step 609). When the home codes are identical (step 610) or when the home codes and the unique home IDs are all different (step 611), the reception node invalidates the received data packet and maintains the non-response state (step 614). When the unique home IDs are identical (step 610) and the home codes are different (step 611), the reception node modifies its home code into the home code included in the home code modification command (step 612).

Accordingly, the succeeding modifying process allows powered-off nodes, or nodes which are otherwise unable to communicate with other nodes in its subnet, to update and modify their home codes at a later point in time after the home code of their subnet has been modified.

While it has been described that each node may include the microprocessor 131, the identifier generating means 132, the identifier setup means 133, the identifier storing means 135, the transceiver 134, the comparing means 137 and the overlap detecting means 136, it is recognized that each of the nodes may comprise other components allowing the above described communication processes to be performed. Further, other constitutional elements and means generally required for communication as well as the components and means for performing the original function of the node may be included. For example, microprocessor 131 may be used for controlling the communication functions of the node or for controlling the original function of the appliance. Additionally, the constitutional elements of the communication device may either be incorporated within the node itself or in a separate communication module, an encoding means (not shown), or a decoding means (not shown) for processing transmitted data.

In one aspect of the present invention, the communication network may be provided within a communications medium such as a power line, telephone line, cable, or any other medium through which data may be broadcasted.

In accordance with the communication network of the present invention, subnet identifier overlap can be timely detected and regulated. As a result, the communication network can be stably operated without errors of the nodes due to subnet identifier overlap.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A node of a subnet connected to a communication network, comprising:
   an identifier generating means for generating at least two types of identifiers for identifying a home subnet of the node;
   an identifier setup means for generating an identifier for identifying the home subnet of the node, wherein the identifier generated by the identifier setup means is different from identifiers of outside subnets;
   an identifier storing means for storing the generated identifiers;
   a transceiver for broadcasting and receiving a data packet, said broadcasted data packet comprising at least one of said at least two types of identifiers over the communication network;
   a comparing means for comparing identifiers included in a received data packet with identifiers of the home subnet of the node that received the data packet; and
   an overlap detecting means for determining whether overlap of an identifier between different subnets exists.

2. The node according to claim 1, wherein a broadcasted data packet comprises an overlap detection signal when said overlap detecting means determines overlap exists, wherein said overlap detection signal includes said overlapping identifier.

3. The node according to claim 1, wherein
   a broadcasted data packet comprises an identifier hail signal; and
   said identifier setup means modifies an overlapping identifier included within said identifier hail signal.

4. The node according to claim 3, wherein a broadcasted data packet comprises an identifier modification command, said identifier modification command comprising said modified overlapping identifier and said overlapping identifier.

5. The node according to claim 1, wherein
   a received data packet comprises a received identifier hail signal;
   said comparing means compares identifiers included in said received data packet with identifiers identifying the home subnet of the node; and
   a broadcasted data packet comprises a non-acknowledgment signal when an identifier included within said received data packet is identical to a corresponding identifier identifying the home subnet of the node.

6. The node according to claim 5, wherein a received data packet further comprises a non-acknowledgment signal; and said identifier generating means generates a new identifier when said transceiver receives the non-acknowledgment signal.

7. The node according to claim 5, wherein
a received data packet comprises an identifier hail signal;
said comparing means compares said identifiers included in said received data packet with said identifiers identifying the home subnet of the node;
said transceiver maintains a non-response state when an identifier included within the received data packet is different from a corresponding identifier identifying the home subnet of the node; and
said identifier setup means generates said corresponding identifier identifying its home subnet as a formal identifier for identifying its home subnet when said transceiver does not receive a non-acknowledgment signal within a predetermined amount of time after broadcasting an identifier hail signal.

8. The node according to claim 1, wherein a broadcasted data packet comprises a starting signal generated when said node is powered-on.

9. The node according to claim 8, wherein a broadcasted data packet comprises an identifier modification command when a received data packet comprises a starting signal, wherein a first portion of identifiers included in said received data packet is identical to corresponding identifiers identifying the home subnet of the node and when a second portion of said identifiers included in said received data packet is different from corresponding identifiers identifying the home subnet of the node; and
said comparing means compares identifiers included in a received data packet with identifiers identifying the home subnet of the node.

10. The node according to claim 1, wherein
a received data packet comprises an identifier modification command; and
said comparing means compares identifiers included in said received data packet with identifiers identifying the home subnet of the node; and
said identifier setup means modifies generated identifiers into identifiers included in said received data packet when a first portion of said identifiers included in said received data packet is identical to identifiers identifying its own subnet and when a second portion of said identifiers included in said received data packet is different from identifiers identifying the home subnet of the node.

11. The node according to claim 1, further comprising an open communication medium, wherein said open communication medium connects said node to said subnet.

12. The node according to claim 11, wherein said open communication medium comprises a power line.

13. A communication module connected to a subnet, comprising:
an identifier generating means for generating at least two types of identifiers for identifying the subnet;
an identifier setup means for generating an identifier for identifying a home subnet of the communication module, wherein the identifier generated by the identifier setup means is different from identifiers of outside subnets;
an identifier storing means for storing the generated identifiers;
a transceiver for broadcasting and receiving a data packet, said broadcasted data packet comprising at least one of said at least two types of identifiers over a communication network;
a comparing means for comparing identifiers included in a received data packet with identifiers of the subnet that received the data packet; and
an overlap detecting means for determining whether overlap of an identifier between another subnet exists.

14. The communication module according to claim 13, wherein a broadcasted data packet comprises an overlap detection signal when said overlap detecting means determines overlap exists, wherein said overlap detection signal includes said overlapping identifier.

15. The communication module according to claim 13, wherein a broadcasted data packet comprises an identifier hail signal; and said identifier setup means modifies an overlapping identifier included within said identifier hail signal.

16. The communication module according to claim 15, wherein a broadcasted data packet comprises an identifier modification command, said identifier modification command comprising said modified overlapping identifier and said overlapping identifier.

17. The communication module according to claim 13, wherein
a received data packet comprises a received identifier hail signal;
said comparing means compares identifiers included in the received data packet with identifiers identifying the subnet; and
a broadcasted data packet comprises a non-acknowledgment signal when an identifier included within said received data packet is identical to a corresponding identifier identifying the subnet.

18. The communication module according to claim 17, wherein a received data packet further comprises a non-acknowledgment signal; and said identifier generating means generates a new identifier when said transceiver receives the non-acknowledgment signal.

19. The communication module according to claim 17, wherein
a received data packet comprises an identifier hail signal;
said comparing means compares said identifiers included in said received data packet with the identifiers for identifying the subnet;
said transceiver maintains a non-response state when an identifier included within said received data packet is different from a corresponding identifier identifying the subnet; and
said identifier setup means generates said corresponding identifier identifying the subnet as a formal identifier for identifying its home subnet when said transceiver does not receive a non-acknowledgment signal within a predetermined amount of time after broadcasting the identifier hail signal.

20. The communication module according to claim 13, wherein a broadcasted data packet comprises a starting signal generated when said communication module is powered-on.

21. The communication module according to claim 20, wherein
a broadcasted data packet comprises an identifier modification command when a when a received data packet comprises a starting signal, wherein a first portion of identifiers included in said received data packet is identical to corresponding identifiers identifying its own subnet and when a second portion of said identifiers included in said received data packet is different from corresponding identifiers identifying the subnet; and said comparing means compares identifiers included in a received data packet with identifiers identifying the subnet.

22. The communication module according to claim 13, wherein a received data packet comprises an identifier modification command; and said comparing means compares the identifiers included in said received data packet with the identifiers identifying its home subnet; and said identifier setup means modifies generated identifiers into identifiers included in said received data packet when a first portion of said identifiers included in said received data packet is identical to identifiers identifying the subnet and when a second portion of said identifiers included in said received data packet is different from identifiers identifying the subnet.

23. The communication module according claim 13, further comprising an open communication medium, wherein said open communication medium connects said communication module to the subnet.

24. The communication module according to claim 23, wherein said open communication medium comprises a power line.

25. A method for detecting overlap of a first identifier type between subnets using a second identifier type, wherein the second identifier type identifies a home subnet on a communication network where nodes belonging to the same subnet communicate with each other by enabling a transmission node to generate a data packet including the first identifier type, wherein the first identifier type identifies the home subnet of the node and broadcasts said data packet over the communication network using an open communication medium, and enabling a reception node to either validate received data packets when a first identifier type included in the received data packet is identical to a first identifier type identifying its home subnet or to invalidate the received data packets when the first identifier type included in the received data packet is different from a first identifier type identifying the home subnet of the node, comprising:

generating a data packet including said first identifier type and a second identifier type of said transmission node;

broadcasting said generated data packet over the communication network;

comparing said first and second identifier types included within said broadcasted data packet with first and second identifier types identifying a home subnet of said reception node;

and determining that said home subnet of said reception node is identified by the same first identifier type as another subnet when first identifier types of the broadcasted data packet and said home subnet of the reception node are identical and the second identifier types of the broadcasted data packet and said home subnet of the reception node are different.

26. The method according to claim 25, further comprising broadcasting an overlap detection signal from the home subnet of reception node after the determining step.

27. The method according to claim 26, further comprising:

modifying said first identifier type after the overlap detection signal is broadcasted; and broadcasting an identifier modification command over the communication network, wherein the broadcasted identification modification command modifies first identifier types of nodes on the home subnet of said reception node.

28. The method according to claim 27, wherein nodes on the home subnet of said reception node modify their first identifier types according to the identifier modification command broadcasted by the reception node.

29. The method according to claim 25, wherein said first identifier type comprises a home code and said second identifier type comprises a unique home ID.

30. The method according to claim 25, wherein said open communication medium comprises a power line.

31. A method for detecting overlap of a first identifier type between subnets and modifying an overlapping first identifier type using a second identifier type, wherein the second identifier type identifies a home subnet on a communication network where nodes belonging to the same subnet communicate with each other by enabling a transmission node to generate a data packet including the first identifier type, wherein the first identifier type identifies the home subnet of the node and broadcasts said data packet over the communication network using an open communication medium, and enabling a reception node to either validate received data packets when a first identifier type included in the received data packet is identical to a first identifier type identifying its home subnet or to invalidate the received data packets when the first identifier type included in the received data packet is different from a first identifier type identifying its home subnet, comprising:

generating a first identifier type for identifying the home subnet of the node;

temporarily storing said generated first identifier type;

generating an identifier hail signal, the identifier hail signal including the temporary first identifier type and an existing second identifier type;

broadcasting said generated identifier hail signal on the communication network;

determining whether a non-acknowledgment signal transmitted in response to said broadcasted identifier hail signal has been received within a predetermined amount of time;

repeating the steps from generating the first identifier type to broadcasting when it is determined that a non-acknowledgment signal has been received within said predetermined amount of time; and generating and storing said temporary first identifier type as a formal first identifier type when the it is determined that a non-acknowledgment signal has not been received within said predetermined amount of time.

32. The method according to claim 31, wherein the determining comprises:

(a) counting a predetermined number of clock signals generated and maintaining a standby state;

(b) determining whether a received data packet includes a non-acknowledgment signal;

(c) determining whether said non-acknowledgment signal included within said received data packet includes a non-acknowledgment signal transmitted in response to its broadcasted identifier hail signal when it is determined that said received data packet includes a non-acknowledgment signal; and (d) determining whether the predetermined number of clock signals counted during the standby step exceeds a predetermined value if it is determined that said non-acknowledgment signal is not transmitted in response to said broadcasted identifier hail signal, wherein if a result of (b) or (d) is negative, the method from maintaining said standby state is repeated, if a result of (c) is positive, the method from generating and storing the first identifier type is repeated, and if a result of (d) is positive, the method advances to storing the temporary first identifier type as said formal first identifier type.

33. The method according to claim 31, further comprising modifying first identifier types of nodes on the same home subnet as the transmission node into the same first identifier type after the step temporarily storing said first identifier type.

34. The method according to claim 33, further comprising generating an identifier modification command, the identifier modification command including the modified first identifier type and said existing second identifier type;

broadcasting said identifier modification command over the communication network; comparing said existing second identifier type included in said broadcasted identifier modification command with a second identifier type of a reception node receiving the broadcasted identifier modification command; and modifying a first identifier type of the reception node into the first identifier type included in the identifier modification command when the second identifier types are identical each other.

35. The method according to claim 31, wherein said first identifier type comprises a home code and the second identifier type comprises a unique home ID.

36. The method according to claim 31, wherein said open communication medium comprises a power line.

37. A method for modifying a first identifier after a powered-off node is powered-on using a second identifier, wherein the second identifier identifies a home subnet of the node, after other nodes of the home subnet modify their first identifiers in a communication network where nodes belonging to the same subnet communicate with each other by enabling a transmission node to generate a data packet including the first identifier for identifying the subnet of the nodes and broadcast the data packet over the communication network using an open communication medium, and enabling a reception node to either validate received data packets when the first identifier included in the received data packet is identical to a first identifier identifying the home subnet of the reception node or to invalidate the received data packets when the first identifier type included in the received data packet is different from a first identifier identifying the home subnet of the reception node, comprising:

a starting node generating a starting signal including the first identifier and the second identifier and broadcast the starting signal on the communication network;

a reception node comparing the first identifier and the second identifier included in the received starting signal with the first identifier and second identifier of the reception node;

a reception node generating an identifier modification command including the first identifier and second identifier of the reception node and broadcasting the identifier modification command when the first identifiers are different and the second identifiers are identical in the first identifier comparing step;

a starting node comparing the first identifier and the second identifier included in the received identifier modification command with its first identifier and second identifier of the starting node, the reception node modifying the first identifier of the reception node into the first identifier included in the identifier modification command when the first identifiers are different and the second identifiers are identical in the second identifier comparing step.

38. The method according to claim 37, wherein the first identifier comprises a home code and the second identifier comprises a unique home ID.

39. The method according to claim 37, wherein said open communication medium comprises a power line.

* * * * *